US008261979B2

(12) United States Patent
Gressel et al.

(10) Patent No.: US 8,261,979 B2
(45) Date of Patent: *Sep. 11, 2012

(54) SYSTEM AND METHODS FOR VENUE CONTROLLED BUY-BACK AND RESELLING OF ACCESS PRIVILEGES AND TICKETS TO CLOSED GROUP EVENTS

(75) Inventors: Carmi David Gressel, Mobile Post Negev (IL); Ran Granot, Yavne (IL); James Philip Rosenthal, London (GB); Gabriel Vago, London (GB)

(73) Assignee: Fortress GB Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,673

(22) Filed: Sep. 27, 2011

(65) Prior Publication Data

US 2012/0018512 A1 Jan. 26, 2012

Related U.S. Application Data

(63) Continuation of application No. 11/662,882, filed as application No. PCT/IL2005/000424 on Apr. 21, 2005, now Pat. No. 8,056,802.

(60) Provisional application No. 60/610,032, filed on Sep. 16, 2004.

(51) Int. Cl.
*G06K 7/01* (2006.01)
(52) U.S. Cl. ............... 235/382.5; 235/382; 235/375; 235/380
(58) Field of Classification Search ........ 235/375–382.5
See application file for complete search history.

(56) References Cited

U.S. PATENT DOCUMENTS

| 3,829,662 | A | 8/1974 | Furahashi |
| 4,312,198 | A | 1/1982 | Sedley |
| 4,839,640 | A | 6/1989 | Ozer et al. |
| 5,056,141 | A | 10/1991 | Dyke |
| 5,204,663 | A | 4/1993 | Lee |
| 5,321,395 | A | 6/1994 | Van Santbrink |
| 5,337,043 | A | 8/1994 | Gokcebay |
| 5,367,148 | A | 11/1994 | Storch et al. |
| 5,397,884 | A | 3/1995 | Saliga |
| 5,477,041 | A | 12/1995 | Miron et al. |
| 5,495,235 | A | 2/1996 | Durinovic-Johri et al. |
| 5,939,694 | A | 8/1999 | Holcomb et al. |
| 5,986,550 | A | 11/1999 | Rapaport et al. |
| 6,308,159 | B1 | 10/2001 | Strohl |
| 8,056,802 | B2 * | 11/2011 | Gressel et al. ............ 235/382 |

(Continued)

FOREIGN PATENT DOCUMENTS

JP 2004239820 A 8/2004

(Continued)

OTHER PUBLICATIONS

Kowalski, J., "Kowalski's Big Bet on Contactless," Card Technology, May 2004, pp. 31-34.

(Continued)

*Primary Examiner* — Thien M. Le
*Assistant Examiner* — Christle Marshall
(74) *Attorney, Agent, or Firm* — Kinney & Lange, P.A.

(57) ABSTRACT

Methods and apparatus for controlling venue buy-back and resale of access privileges to controlled group events limiting third party trading of subscription.

49 Claims, 12 Drawing Sheets

U.S. PATENT DOCUMENTS

| | | |
|---|---|---|
| 2001/0018660 A1 | 8/2001 | Sehr |
| 2002/0169666 A1 | 11/2002 | Ike et al. |
| 2003/0208406 A1 | 11/2003 | Okamoto et al. |
| 2004/0002305 A1 | 1/2004 | Byman-Kivivuori et al. |
| 2004/0093309 A1 | 5/2004 | Nakamura et al. |

FOREIGN PATENT DOCUMENTS

| | | | |
|---|---|---|---|
| WO | 9926203 | A1 | 5/1999 |

OTHER PUBLICATIONS

Carmi Gressel et al., U.S. Appl. No. 60/565,393, "Multi-Factor Security System With Portable Devices and Security Kernels," filed Apr. 22, 2004.

Supplementary European Search Report of counterpart Application No. 05735039.9-1229/1800209, PCT/IL2005/000424, filed Feb. 24, 2010.

* cited by examiner

SYSTEM AND METHODS FOR VENUE CONTROLLED BUY-BACK AND RESELLING OF ACCESS PRIVILEGES AND TICKETS TO CLOSED GROUP EVENTS

FIELD OF THE INVENTION

The present invention relates to secured access to real and virtual venues, and, in particular, to systems and methods for monitoring and controlling personal access in dynamically changing large closed groups.

BACKGROUND OF THE INVENTION

It is well known that crowd control is necessary in many common venues, such as sports events, rock concerts, hotels, universities, and others It would also be desirable to handle crowd control in ways that are amenable to integrating ancillary services and products that are user friendly, and beneficial to both the system operator and to the user.

The backbone of this inventive system is the integration of a multiplicity of modern methods and apparatus around an accelerated people behavior control concept which could typically allow a concurrently available single smart card chip, off-line, to authenticate a vital up-to-date estimation of a single member of group of over two million members, or for a stadium control box to know even more relevant information about one or more individual from a plurality of membership groups, e.g., all of the fans of all of the leagues in the United Kingdom. Using this proprietary tested method, sports arenas and concert halls, universities and hotels can offer services and product in a more amenable fashion, at lower cost, with any such level of security which would be commensurate to the state of art, the resources available to the users, owners and unfortunately, the vast capabilities and resources of adversaries.

Hotel operators typically control hotel guests' access to hotel rooms with mechanical locks and metal keys, and mechanically differentiated, magnetically coded, or chip-card tokens. Stadium operators serve dynamically active crowds, consisting of enthusiastic fans of local and often adversarial teams; several classes of season subscribers; corporate and other fans with various entitlements; "aways" (mostly fans from the opposing team); buy-back "ticket" purchasers (from season subscribers who get remuneration for matches they cannot attend where the seat may be sold to an entitled fan or a chance purchasers); and of vital importance, stadium and sport club employees. As opposed to relatively acquiescent hotel guests or university students, sports fans are often an unruly crowd, with adversarial interests, demanding intense service in a short time interval.

Hotel keepers typically abandoning conventional door locks with keys, as they suffer from expensive lock maintenance, often demanding key replacement, lock adjustment or lock replacement typically caused by the "forgetful" guest who fails to return his keys upon leaving the hotel. Typically, conventional door locks are being replaced by a variety of coded plastic devices. Popular entitlement devices are magnetic stripe cards, magnetically coded and semiconductor embedded chip keys resembling conventional keys and mechanically coded (typically with strategically placed holes) tokens.

Typically, the electronic lock acceptors are self-contained, off-line operative and battery powered; occasionally the devices are wired; either networked to the guest check-in counter for on-line operation, or wired, only to avoid problems related to batteries and the difficulties of timely replacement.

In all instances, elaborate means are necessary to ensure that at a given time interval, the door lock will recognize the token to be bona fide, and, if possible, with an approved length of stay. In addition, means must be provided to ensure that authorized hotel employees can gain entrance to the hotel room, to provide routine and emergency services, e.g., cleaning or forced entrance to care for a disabled guest. In many installations, such hotel service personnel would have master electronic or mechanical master keys. Synchronizing the system, so that a door will recognize a synchronously encoded key to allow legitimate entrance at a given time, is typically the problem that faces designers of such systems. Typically, a new synchronized key or keys must be presented to the hotel door, when a guest's key is inoperative. Such service, typically, overrides normal security procedures. The principle involved in such conventional mechanical lock and electronically controlled door lock settings is that that the a door must be synchronized with specific parameters in advance to recognize the unique features of the token or key. Electronic keys typically possess time-variant features, and the systems typically employ vulnerable schemes for synchronization, whereas any mechanical time-variance entails manual mechanical adjustment or replacement.

Manually synchronized mechanical locks are described in Sedley, U.S. Pat. No. 4,312,198. Sedley's lock consisted of a non-magnetic key studded with small magnets, operative to repel magnetic studs in the lock mechanism. The placement of the studs in the lock could be changed manually by a tool operative to alter the small magnet "combination". Saliga, in U.S. Pat. No. 5,397,884 suggests a time variant code system, where the hotel check-in desk would algorithmically insert a series of time linked codes relating to the projected stay of the guest in the hotel. The door lock's microprocessor with a real-time clock, would then ascertain if a link code in the key's memory matches a current access code. U.S. Pat. No. 5,939,694 describes a check-in station for hotels, operative to issue time linked access control devices for VingCard AS, Norway's diverse access control product line of magnetic striped plastic cards, smart cards, and other plastic security devices. U.S. Pat. No. 5,321,395 describes a wireless electronic smart card type access control system, wherein a via a tuned circuit, a wireless contactless is activated to emulate a time variant keycode of entrance.

The methods of this invention are operative to safely prove identity of a valid entity in a system, to supply information to a cryptographically operated reader, with relative small memory size able to allow off-line entry to an applicant for entrance pendant on recent or immediate status of the applicant, as to the point of entry, the expected time interval of entry, and in some instances to revert in due time to an on-line mode as would be necessary in a crowd control environment, or time and attendance entrance points for university or hotel employees.

Older Fortress GB Ltd. systems, some of which were deployed several years ago, handle up to 50,000 dynamically changing system clients, and presently deployed systems are able to accommodate up to 250,000 system clients in a disbursed environment with a plurality of entry points. Fortress GB Ltd's competitors have not been able to control access to such large clientele. The new systems, will easily accommodate up to 1,000,000 potential users of such a system, where each of the 1,000,000 applicants for entry are recognizable in any one of the plurality of off-line points of entry. With new low-cost orders of magnitude large non-volatile memory, future entry controllers will easily accommodate, off-line, hundreds of millions of users' tokens and tens of millions of reader devices, embedded in a plurality of conventional and futuristic devices.

These systems have been and are being deployed with a multiplicity of security levels, methods and devices. Typically, the connections between the readers, servers, issuing computers and door and gate controllers have been protected with Public Key and symmetric Cryptographic means, e.g., RSA, DES, 3DES and Wolfram methods. Multi-application and multi-vendor applications have typically been implemented on public key protected smart cards and SIM chips. Users have had the benefit of multi-application public key protected smart cards and a plurality of emulated public key applications, using contactless Inside and Mifare devices.

In applicant's Provisional U.S. application No. 60/565, 393, methods and apparatus for communicating with contactless smart cards are described, wherein the antenna in the terminal device, e.g., mobile phones, USB secured mass memory devices (Intellifiers) depicted in FIGS. 14 and 15 are integrated into the keypad of said terminal devices. In this patent we suggest that the antenna may also be included in the front plastic case or plastic clam shell cover of a terminal, to reduce power consumption, especially important for very near field NMR (nuclear magnetic resonance) used in unique substance detection, e.g., the materials manufactured by Micro Tag Temed Ltd., wherein such materials and means of detection are revealed in U.S. Pat. No. 5,986,550. In this document, we refer to the applied proprietary material as magnetic icons, or by the applicant's trademark, Magicon. In the drawings we have depicted a Magicon residing in the same near field with semiconductor elements containing memory elements that may be adversely affected by the strong NMR fields. In such instances it may be necessary to either apply higher concentrations of proprietary detectable magnetically resonating substances, or alternately, to assure that the semiconductor memory element is designed to be sufficiently immune to the electro-magnetic field necessary for validating the existence of the proprietary substance.

The idea of wireless communicating with microchip memories with a variety of devices is described in applicant's Provisional U.S. application No. 60/565,393. In that application the device antenna is on the keypad or the front cover of the terminal device. The idea of communicating with posters via mobile devices also appears in "Kowalski's Big Bet on Contactless", in Card Technology of May 2004, page 31.

In this invention, we have set out bases for business plans and technological combinations for negotiating product purchases, for mobile phone betting at the arena or purchasing tickets to a rock concert, etc., where the incentive is a poster with an embedded equivalent of a large memory smart card. Typically, embedded in the microchip is a proprietary material, typically one of the unique Micro Tag's proprietary NMR resonating materials, recognizable by the contactless magnetic scanner via the smart card contactless antenna, typically, giving assurance of origin of the token substrate. The mobile phone downloads the event program, a betting card, a mobile phone negotiation application from a poster. During or previous to the event, the user can place bets, learn the results of his wagers and receive last-minute updates of other sporting events where wagers may still be recorded. At a symphony concert, the user will know that his phone will not ring, except at intermission, and he will have, on the mobile screen, a review of the program, the instrumentalists, the sponsors, possibly with advertisements. At an opera, an additional benefit would be an on-line libretto, in the vernacular or the original, sponsored by an advertiser, or paid for by the user.

SUMMARY OF THE INVENTION

The following terms are used in the specification and drawings and are hereby clarified commensurate to usage in the specifications and drawings:

Acceptable token: a token operative to prove to a token terminal that a token holder has received authorization commensurate with acceptance criteria of said terminal device to allow access privileges.

Access: the controlled privilege of physical and or virtual entrance into a venue.

Active member of community: a token-owning user recognized by the system operator to be in good standing and belonging to an operator-authorized community.

Antenna: a configuration of electrical conductors embedded in terminals and tokens, to enable wireless communication between the terminals and tokens, and also in preferred embodiments for transmitting terminal-generated electromagnetic signals for excitation of magnetic resonance, and for detecting resonance frequencies of NMR-detectable substances, typically as disclosed in applicant's provisional U.S. Patent Application, 60/565,393.

Applicant: a user who has presented a token to a terminal, thereby, typically implicitly requesting privileged access, e.g., applying, with a mobile phone Intellifier to a betting terminal to negotiate a bet; applying a contactless smart card to an Intellifier.

Application: a procedure or set of procedures that enable users to benefit from computerized systems; e.g., a betting application typically includes procedures to inform users of current odds; procedures to transfer value from a user's account to the betting system account; and procedures to transfer value from a betting system account to a user's account.

Arena: a dynamically changing closed environment to which audiences, spectators or members of a community have restricted rights of entry, e.g., stadiums, concert halls, ballrooms, etc.

Attached (wireless tokens in posters according to embodiments of the present invention): affixed onto any surface, imprinted thereon, or embedded in a material or substrate thereof. Typically secured passive or active wireless electronic devices attached to posters relates to secured passive or active typically wireless electronic devices, which are attached to posters, non-limiting examples of which are paper or plastic. Such devices typically include an antenna, a microcontroller, and non-volatile memory.

Attend: to gain access or to become a spectator, participant, observer, or user in a controlled participation event, e.g., a soccer game, a rock concert, a conference, a forum.

Attribute: a property, or characteristic of a user or token, non-limiting examples which include: a privilege, an entitlement, a status, and other single-valued operator-certified qualities used as criteria for controlled access. More specific attributes include, but are not limited to: season subscriber, expected attendee, VIP, club steward, credit rating, credit allowance, gender, age group, a veteran status, marital status, etc.

Authenticate: to establish the relevant status of a token and the token holder. Authentication processes include cryptographic (symmetric and asymmetric) certification and proof of validity processes; processes that prove origin of an authorized priority; processes that include but are not limited to prove that the token holder is the entitled owner of the token, e.g. biometric identification or knowledge of confidential information, typically known only to the authenticator and the token owner.

Authenticator: any means or individual authorized or entitled to authenticate entities; e.g., users, tokens, proprietary substances, etc.

Authorization: the qualification of status and priorities of system users. Authorization is typically manifested in issuing tokens identifying users and user status, in a manner in which system devices, e.g., terminals, university and hotel door locks, point of sale, betting computers and other devices can provably authenticate.

Authorizations for controlled access: entitlements granted by an entity and/or device authorized by the system operator and verifiable by system-authorized terminals and token readers.

Barcodes: a commonly used optically identifiable coding system consisting of varied width numerically identifiable black bars. In preferred embodiments of this invention, barcodes are invisibly masked by a coating of invisible ink, identifiable only when radiated by a resonating frequency numerically encoded and cryptographically identifiable by the system. In more secure preferred embodiments, the bar code is printed with magnetic ink on a black non-magnetic substrate, and covered with a secret invisible ink. In such embodiments, only a barcode reader is operative to read the coding, and normal copying machine, such as a typical Xerox device, is incapable of copying the printed magnetic ink barcode on the black substrate, the magnetic ink reader could not read a non-magnetic ink, and a suitable invisible ink detector detects the absence of the invisible ink covering.

Barrier: a physical obstruction, typically computer controlled, e.g., turnstiles, gates, locks, etc., operative to control physical access of persons.

Biometric identifier: a quantifiable, measurable, and computer and human recognizable physical attribute, useful for enhancing user identification and proof of a one-to-one relation to ID tokens for applications defined herein. Examples of such uniquely definable attributes include, but are not limited to: facial images, fingerprint images, finger geometry measurements, unique data that a user knows, magnetic resonance images of body parts, etc. Templates for comparing such attributes are preferably stored and evaluated in tokens and or in secured devices, typically from secured data bases.

Blocked List: a file listing wherein specific token-identifying bits signify that a numbered token is permanently denied (revoked) or temporarily denied (rescinded) of the entitlement relevant to the listing. Typically, the blocked listing includes a time-stamp.

Buy-Back: the profitable scheme for "recycling" a season subscription user's privilege to attend an event. The operator refunds a portion of the price of the subscription and is able to resell the privilege to another patron. The subscriber typically chooses to arrange the buy-back with the operator, else he entrusts a third party with her/his valuable token. This prevents the typically illicit practice of hoarding and scalping. The process is typically accelerated and simplified by the Fortress GB Ltd. proprietary listing system, and is an integral part of the process demonstrated in FIG. 5. In a preferred embodiment, typically, the issuing station complements the subscriber's bit in the "expected binary list of attendee tokens", before cut-off-time, subsequently enabling the ticketing station to process a second privilege. In preferred embodiments typically the purchaser is a member of the community who has reserved preferential rights to purchase such privilege. In preferred embodiments, the operator's ticketing office is entitled to deliver tokens issued by the issuing station and to issue tokens authorized by the issuing station, typically for simple one-time authorized ticket tokens.

Clock, Real-Time Clock: a device operative to measure and reveal date and time of day, in the conventional sense. Typically, a clock is battery backed and reasonably accurate, typically used to aid in defining time frames for token holder's priorities; e.g., a steward's free entrance priority typically is for specific events several hours previous to the event; a hotel maid's token's priority is typically for a given day, to a given section of rooms, for a defined time frame; a token holder who purchased entrance privilege to an event after terminals activity lists were updated, i.e., after cutoff time. After cutoff time, purchase tokens have certified authenticateable time-stamps recorded in the token allowing terminal devices to grant access subsequent to proof of entrance privilege, thereby allowing access, despite the absence of proof of the token holder's proof of privilege on the terminal's activity listing. Typically, file listings include time-stamps.

Closed Circuit Television (CCTV) system enhancement: any of various options typically synchronized to a user's entering a controlled area. Typical CCTV enhancements display user images on control box monitors, to record, analyze, and compare such images to users' images in typically confidential operator's data bases, and to transmit images to an arena control room to aid in controlling illicit applicants, unruly users and or groups of users.

Cluster: a group of conceptually allied entities typically interconnected or capable of being controlled by a central controller; e.g., the group of gates regulated by a control box; the troop of stewards monitoring crowd movements; the betting computers in the arena; the disbursed personal computers with Intellifiers.

Community: a dynamically changing group of users and/or users' tokens with interests typically common to the system operator. Non-limiting examples include: the communities of students, patrons, performers, and employees of universities, symphony orchestras, football clubs, hotels or universities. Also, a dynamically changing group of tokens which also includes tokens that an operator intends to issue.

Complement, binary: the act of changing the binary value of a bit; i.e., a previously-set "1". (one bit value) is changed to a "0" (zero bit value); and a previously-set "0" (zero bit value) is changed to a "1" (one bit value). A bit is complemented only if the previous value of the bit does not signify the present authenticator determined value; e.g., if a passed-back token is presented to the token-reader, typically, entitlement to enter has been rescinded, and the entitlement bit has been revoked. In such an instant, passage will be denied, and the binary entitlement bit will not be complemented. Typically, the steward will be alerted, and the event will be recorded in a history file, to be statistically analyzed.

Control Box, Control Box Sub-systems: a gate-controlling module consisting of one or more computer devices with activity listings to enable token terminals and readers to ascertain entrance priorities, to supply statistics to venue network servers and to control operation of turnstiles and other barriers, to operate light indicators, and, in higher security embodiments to execute a combination of other functions, e.g., to operate data or image monitors, to control and record images of spectators who have passed the barriers, to ascertain origin of token, etc.

Cut-off-time, Cut-off-time stamp: a predetermined instant when listings for specified peripherals are finalized, which is certified or "stamped", typically by a cryptographic process. Consequently, any grant of rights and/or privileges issued after such an instant, typically requires operator terminal's validation of the token's entitlement. Typically, in order to grant entitlement, such a process proves to the terminal that the token's memory contains a secret, or a provable trace of a secret, which is difficult for an attacker to contrive, thereby proving operator's authorization.

Data Base: a collection of one or more typically confidential data files containing data relevant to users' status, priorities, financial accounts, paid up subscriptions, expected participation at events, records of unruly behavior, etc.

Door Lock, Door Lock Controller: a typically off-line passage controller device operative to authenticate token devices' assigned rights of entry, in a given time interval, with mechanisms to enable the token holder to open the door upon removal of the authenticated token. Typically, the internal computerized door lock mechanism records the history of entrees and the time of day and the date of entry.

Door Master: a Fortress GB Ltd. trademark for a typically PDA driven interface between a computing center and a, typically, isolated device. A Door Master is particularly operative to initialize and update off-line devices, especially door locks. Typically, the PDA: down-loads updated activity listings and operating software to update such activity listings in said off-line devices. In preferred embodiments, software typically complements one bit of a list to designate revocation of a token right, typically indicating that a specified token which previously had rights to unlock a specific door lock is henceforth banned. In a university environment, only a single door lock typically need be changed when either the token is revoked because of loss of the token or in case of revocation of a student's access rights. The door lock mechanism first ascertains that the token is an active token in the university, and subsequently ascertains if the token holder is provably authorized to unlock the door. In an alternate preferred embodiment, a newly issued doorlock token may "disenfranchise" previously entitled tokens.

Gate: a passage controlling unit typically including combinations of turnstiles or other barriers, token authenticating terminals, and light indicators clustered in sections and controlled by a control box.

Gate Master: a Fortress GB Ltd. trademark for an interface between a computing device, typically a PDA, and a token-accepting terminal in a cluster of gates which is typically temporarily or permanently not networked to a central computer, capable of down-loading updated activity listings, operating software, and to update activity listings.

Event: an expected happening that occurs during an approximated time frame, to which token holders aspire to participate; e.g., wrestling matches, football games, concerts, movies, unlocking of doors.

ID: required identification of a user, relative to the context of the application or section of thereof; e.g., at a stadium turnstile, the user or user's token may be required only to prove at least, temporary membership in a community, the right to enter the stadium at a defined section, and proof of having fulfilled requirements for attendance at an event. Within the stadium the user may typically be requested to prove ownership of the token and or rights to be seated in a predefined location.

ID Token: a device used for identification of the token holder and the token holder's privileges; used interchangeably herein with "tokens", contact smart cards, contactless smart cards, and other wireless proximity devices, and/or printed ticket type devices with any combination or use of single protective security means, such as masked magnetic ink and as in preferred embodiments of this invention invisible in masked barcodes and proprietary Magicons; biometric identification with smart card confidentially controlled identifying template; etc.

Initialization, Token Initialization: typically a process or a series of processes, operative to prepare a token with confidential attributes, prior to the personalization process, which is typically enacted at a proprietary Fortress GB Ltd. issuing station.

Invisible Ink: a variety of transparent very thin film masking inks, which display light in a visible to machine or human when irradiated by a resonating frequency operative in preferred embodiments of this invention to mask barcode icons.

Intellifier: a Fortress GB Ltd. trademark for a generic class of multi-factor security computer peripherals, as disclosed in applicant's U.S. Provisional Patent Application No. 60/565,393. Such devices typically communicate with tokens, to securely record and transmit data and to enable negotiations. Typical Intellifiers are configured in USB computer peripherals and in secured mobile phones.

Issuing station: a system, device, or combination thereof for printing; microchip programming, and certifying; magnetic stripe encoding; embossing; encoding and decoding; operative to enhancing tokens with unique attributes, and secret or certified information; and/or to enable secured automatic process of entry, or access to a device, venue or service.

Kiosk: an on-line device for serving users with necessary information, and, in the university environment, to cause value change; e.g., to convert cash to credit for purchase of goods, services, etc.

Light Indicator: a generic term typically used in sports stadium for visual display devices, similar or identical to conventional traffic lights, for clearly indicating to a steward the conditions of entrance or refusal of entry of an applicant, e.g., one color typically indicates that a token is fully paid for, usable by any applicant, another color may indicate use of a child's token, wherein the steward will typically ascertain that the token was not used by an adult, flashing lights typically indicate a potential serious violation, e.g., the token was used at the wrong turnstile; that the token was already used at the event, (passed back), etc., typically demanding immediate attention of the steward.

List, Activity List, Binary List, Byte List, Revoked Membership List: an easily-accessed file wherein each addressable memory bit or word (typically a byte) defines status of one token/token holder relevant to a listing. In a compact university door lock each bit in the file relates to a specific index number of a token, in circulation, or potentially to be issued by the university. A revocation bit is typically complemented, e.g., changed from zero to one, in those instances where a token was issued rights to unlock said door lock and where such rights have been revoked. In the arena environment, each token is typically represented by a byte, typically describing status and expectation of participation of the token holder in the concurrent event. Typically, such file listings include a time-stamp.

Magicon, or magnetic resonating icon: Fortress GB Ltd. trademark, referring to an applied concentration of a suitably-detectable amount of proprietary NMR material onto a token in any detectable form, e.g., implanted in the substrate, mixed into printing ink and applied as a spot, a logo, or an index number.

Mobile Telephone: any conventional mobile telephone, in the preferred embodiments with additional antennas typically operable to communicate with contactless tokens, as disclosed in applicant's U.S. Provisional Patent Application No. 60/565,393, and/or to authenticate traces of proprietary typically magnetically resonant substances.

Near Field, Near Field Communication, NFC: refers to ISO 14443 specification for close contact token communications, see "Kowalski's Big Bet on Contactless", Card Technology, May, 2004. NFC, as opposed to Far Field Communication, uses a low amplitude radiated electromagnetic field to energize, activate, and communicate with a passive contactless device. In this patent, a near field radiation is also used to activate and detect magnetic resonance in a proprietary substance.

Negotiate: to conduct a process or employ a protocol to prove entitlement, to assure transfer of value, or to prove identity. Negotiation is used by system tokens and devices.

Network: the fixed line and wireless networking necessary for systematic regulation; e.g., statistical monitoring, and control of access to devices and closed areas.

NMR, Nuclear Magnetic Resonance: in the context of this patent, a technology based on attributes of traces of proprietary substances which when activated emit signals, typically unique frequency combinations, which enable authentication or detection of fraud. Reference is made herein to near-field NMR detection without a strong static magnetic field, e.g., only affected by the miniscule natural magnetic field, which enables reasonable readings of a compass. Innovatively, in this patent, such detection is enabled using the same, or a similar antenna as normally used in contactless smart card readers.

Numerical Address (of an attribute of a token ID): a number which uniquely identifies a specific attribute in a list. Typically, the numerical address is constructed via a concatenation of: a token ID's numerical value; the numerical location of the bit or bits indicating the attribute; and an optional number for making the numerical address unique, if necessary. In a typical binary listing, the least significant hexadecimal digit of the attribute's numerical address (typically in the range of 0 to 7) signifies the specific bit in the byte address. In a non-limiting example, a token ID number is "12E45", with the requested attribute in list number 2, so that the numerical address is "x..x212E4", where the attribute bit is the sixth rightmost bit in a byte. Here, "x..x" signifies arbitrary digits.

Numerical Value (of a token ID): the identifier of a token ID taken as a number, for associating the token ID with attribute values in an activity list, such as a list of acceptable token ID's. The associated attributes are located via numerical addresses related to the numerical value of the token ID. In a word type activity list, typically the word length is 8 bits (one byte), as 8 attributes are typically sufficient for applications. In typical word applications, each bit signifies a single attribute of a specific tokenholder via that token-holder's token ID. In some embodiments, two bits define related attributes; in a non-limiting example, one read-only bit signifies that a token-holder is an expected attendee, and a second read/write bit signifies whether the token has or has not been used at a particular event.

Off-line: indicates that a function, or data file in a device, e.g., a revoke list or operating program; a peripheral device, e.g., a betting terminal, or group of devices, e.g., a gate cluster is permanently or temporarily not connected to or affected by the central server or other devices in the network, fixed line or wireless and that such device typically is operational when not connected to such networks. Such off-line devices are typically timely loaded with activity lists; e.g., in some preferred embodiments, a "white list" is a file of mostly zeroes, where the occasional one signifies "a token and it's owner are in good standing"; in other preferred embodiments a zero in a "black list" signifies that the operator has rescinded a specific entitlement to a token holder.

On-Line: the communicative state of a device of being connected to the operator's fixed or wireless network, at a specific time. Typically, after cut-off time, a gate controller box "goes" on-line only when polled by a server to supply crowd relevant statistics, e.g., the number of users who have entered the stadium via the gate cluster, the priority and/or status of said users, or instantaneously to notify the crowd control room of potential or concurrent danger, crowd unruliness or violence.

Operator: an entity responsible for granting and denying users defined privileges, priorities status, typically in defined venues, and typically by authorizing and disbursing tokens to users in a secured manner and to maintain control over networked crowd control devices and other arena functions. Explicit examples of system operators in this document are arena operators, typically football club administration entities, and university administrators, authorized to qualify users and quantify users' privileges.

Override, Override access listing: to perform an operator authorization granted after cut-off-time stamped listings have been compiled and issued. Typically, tokens have secured means to prove authenticity of granted privilege, e.g., asymmetric or symmetric cryptographic methods for mass authentication.

Participant: a user with typically limited access to a controlled event; e.g., a participant in a conference typically is limited to points of access, and limited in allowed time intervals.

Passage Controller: see barriers, door lock controllers, turnstiles and gates.

PDAs (Personal Digital Assistant or Personal Data Assistant): handheld personal computers, typically with wireless communication attributes. In this invention, PDAs, used by stewards, are typically enabled to communicate with the server either via an on-line wireless network or with manually inserted flash memory devices. Typically, they include modules to read tokens, e.g., barcodes, contactless smartcards, or conventional contact smartcards. The stewards typically use PDAs to aid users to know and find seating arrangements. In those instances wherein arena control boxes, door locks, information kiosks, points of sale, or betting stalls are permanently or temporarily isolated (off-line), priority lists are typically downloaded into such PDAs and subsequently downloaded to such isolated devices with appropriate interfaces, e.g., Gate Masters, Door Masters, etc. typically, off-line devices have battery backed real time clocks, which are typically reconciled to exact time of day and date with said interfaces.

Person: see user, token holder, etc.

Performer: a user in the community, with access to restricted areas, e.g., the locker rooms and soccer field pitch.

Personalization, Token Personalization: is the process of preparing a token with uniqueness and confidentiality, linking the token to the authorized token-holder. Typically, personalization of a token follows a manufacturer's initialization of a device, enabling personalization. Typically, Fortress GB Ltd. issuing stations are operative to personalize contact and contactless configured smart cards.

Poster: a conventional sign or conventional poster with an attached wireless token typically of types used in contactless smart cards with large non-volatile memories, operative to communicate with wireless handheld communicators, terminals and token readers, e.g., mobile telephones of types described in this document, to enable such users' communicating devices to negotiate with said wireless poster tokens, and to download from said poster tokens relevant data and applications.

Predetermined number of bits (per word): the size specified for a word, in bits. Typically this is the number of bits assigned to each token ID in a listing. In an embodiment of the present invention, compact listings are utilized wherein each token-holder's attributes are stored in one word. In the non-limiting case of byte lists, the predetermined number of bits in the word is eight.

Predetermined bit value: a value for a bit selected to be either a "0" or a "1". Bit values typically represent a binary attribute, e.g., in a non-limiting example, a predetermined bit value of "0" indicates that a token-holder is an expected attendee at an event. Accordingly, a "1" correspondingly indicates that the token-holder is not an expected attendee at the event. In this example, when the token-holder enters the restricted area, the control-box will typically complement the "0" bit to a "1" bit. Thus, if the token is illicitly "passed back" to a conspirator, who would then attempt to use the token for a second illicit "passed back" entrance into the restricted area, the control box would recognize the conspirator as an unexpected attendee, and typically flash an alert signal to the steward.

Priority and privilege: equivalent terms referring to operator authority's time-variant certified authorization of user status and privilege in a system relevant to authorized activities in the system.

Priority List: a list of token ID's associated with specified attributes. E.g., suspect list, black list, invalidated list, entitlement list, active list, active member list, expected guest list, and so forth. A priority list references index numbers of closed group tokens. Indexing each token as a single addressable bit, or single byte, enables accelerated confirmation of attribute for a particular token ID, and typically, minimizes need for large memory resources in off-line devices. A priority list is prepared from a central database; typically, the accuracy is limited to an interval prior to the time-stamped instant. A listing in a payment terminal, a betting or point of sale terminal, or a door lock in a university typically contains a revoked access listing relevant to lost or stolen tokens, disqualified users, or tokens suspect as counterfeit. See lists.

Property: an attribute or quality inherent in a user or to device. Non-limiting examples include: a device which is public key protected, a door-lock which is off-line, a terminal which is on-line and battery backed, etc.

Range of Times: time intervals (time of day and date) recognized by terminal devices as privileged authorized times of access by terminals and locks with real time semiconductor clock devices, typically battery backed.

Rescinding (of a token): a temporary denial of rights. In a binary listing such a change is effected by complementing an un-rescinded bit or an un-revoked bit; i.e., in a binary notation, there is no difference between un-rescinded un-revoked, or, conversely, rescinded or revoked. Permanent or temporary denial decisions, relevant to specific attributes are typically authorized by proxies of the operator.

Revocation (of a token): typically a permanent denial of privilege or attribute. In a non-limiting example; when a token is lost or stolen, or if the token-holder has been deprived of rights and privileges, the token is revoked in the list of the community of tokens. See Rescinding.

Revocation List: a listing of the community defining, which tokens have been denied entitlement. In a bit listing, a revoked or rescinded token bit is signified by a bit complemented from the un-revoked state. In a non-limiting example; if a zero signifies an un-revoked status, then a one signifies a revoked status.

Scalper: an individual who buys quantities of entitlements to an event with the intent of reselling at an inflated price. In embodiments of the present invention where subscription tokens (which typically contain many entitlements) replace physical subscription tickets, "scalping" is nearly impossible, as there would have to be a trust between the token owner, the scalper and the scalper's customer, to assure that the token is returned to the token owner after the event. In embodiments of the present invention, the operator pays the subscription holder an un-inflated price for his/her typically reduced price entitlement. The operator then typically complements the token holder seller's entitlement or revocation attribute bit in at least one activity list. When the operator resells the entitlement to a second, previously unentitled token holder, the operator either complements the previously un-entitled token holder's entitlement bit or revocation attribute.

Section of gate entrances: one or more clusters of gates typically corresponding to a closed section of reserved seats, groups of seats, or other arena amenities. Spectators are typically allowed access via predefined sections of gates.

Server, Computer Network Server: a (conceptually) central computing system that regulates a site network, herein described in arena and university environments to serve as a gateway to the Internet, mobile and fixed line telephone network, and optionally to contain supporting data bases.

Smart Card: a conventional paper or plastic configuration of substantially the same size as a conventional plastic credit card, with a semiconductor memory, with or without CPU or crypto-controllers, see "Token".

Smart tokens, buttons, tags, tickets, etc.: see "Token".

Statistics, Crowd: statistics on attendees collected by gate cluster control boxes and analyzed in system servers, that supply vital crowd movement data, to aid in on-time initiation of events, to supply information to police, fire departments, system administrators relative to crowd safety, to security controllers who must pinpoint suspect attendees, e.g., attendees with records or suspected of unruly behavior.

Statistics, History file: concurrent and previously-collected data relating to: negotiations, purchases, granted access, etc. which are accumulated in a terminal device. In a non-limiting example, in a networked arena system, a central computing device polls disbursed terminals to collect crowd flow statistics.

Status: a condition or attribute of a user, a token, or a device in the operator's system. Non-limiting examples include: user status: subscriber, fan, patron, VIP, minor, etc.; token status: revoked, lost, used once in this event, etc.; device status: on-line, off-line, etc.

Steward, Club Steward: a user, direct employee, or indirect employee, e.g., a contract worker or volunteer who typically facilitates the flow of attendees to their assigned seats, aids and directs users to services, supplies services or products to users, services off and on line access means, prevents illicit entry, actions or violence and thereby benefits the venue, place of work, users, and/or event operators.

Subscriber: a member of an operator-administrated community, such as football spectators who are fans of a specific team, patrons of a symphony orchestra, etc. who have typically acquired, in advance, privilege of attending one or more events in a given time frame, typically called a "season".

Successive addresses, successive values: addresses and/or values which are assigned according to a predetermined scheme. The predetermined scheme is not necessarily a sequential numbering or addressing scheme. Non-limiting examples of predetermined schemes for successive values include: 0, 2, 4, 6, 8, etc. (even numbers); 00h, 01h, 02h, 03h, 04h, 10h, 11h, 12h, 13h, 14h, etc. (hexadecimal, the first 4 bits of each word); and 0, 1, 2, 3, 4, 5, etc. (sequential numbers). Typically, in a word attribute listing, token ID's are sequentially-assigned, wherein tokens are numbered from x..x0..000h through x..xF..FFF h (hexadecimal), wherein all numbers in the given range are potential token-ID's. In an embodiment of the present invention, compact binary listings utilize the least significant hexadecimal digit for a bit number ranging from 0 (zero) to 7, and each byte address includes a binary attribute for 8 token ID's.

Terminal, Token Reader: a device that typically retrieves data from tokens, and, in preferred embodiments inserts data into the tokens, and computes functions, many of which are defined herein. In an arena, terminal functions are performed both by a token reader and a control box.

Ticket: a provable entitlement token. In preferred embodiments, tickets are typically tokens with limited entitlement, typically for single entry access, typically using reduced cost methods for proof of access, e.g., paper tickets with Magicon and organic black masked magnetic ink printed bar coded access authorization.

Ticket Office: typically, a location serving as the human operated computerized interface between users and the event operator. Ticket offices typically deliver tokens to entitled users and issue unique authorizations for after cut-off time entitlements.

Time-stamp: a provably-authentic digital declaration of the instant that a certain event occurred; e.g., the recorded instant on a token when a token holder negotiated the privileged attendance to a football match. Typically, such a negotiation declaration is for an event, which occurred after the cut-off time.

Time and Attendance terminal: a closed-community access control terminal similar to other such terminals, with additional statistics-gathering capabilities, which can typically record time-of-entry, time-of-exit, and relays such information via on-line or manual off-line methods; such a terminal is typically connected to servers over wired or wireless networks, and can also share information with off-line terminals.

Token, ID token, personal token: any one of many such devices used in systems which benefit issuers and owners with varying levels of security (protection) depending on resources, costs, potential value to adversaries, loss of income or benefit, and/or liability. Examples of tokens include use of one or more of the following used separately or together: smart cards or parts of smart cards; embedded in plastic or applied on paper or plastic semiconductor or other circuits; contactless or wired devices; bar-coded devices; devices with nonvolatile memory; devices with microprocessor control; devices with secret keys; devices with cryptographic protection, either symmetric or asymmetric; devices containing unique detectable material, color, hologram, picture of user, biometric information, user information typically difficult for an adversary to know, distinct defined attributes, and so forth. A token may appear not only in a smart-card derived device, but may also be installed in a timepiece, in a subcutaneous semiconductor device, on eyeglasses, etc. See "ID".

Token holder, ID token holder: a user (see "User") who, by presenting the ID token, typically seeks benefit and/or access to a controlled area or service by proving membership or other relevance to a closed community through the aid of the token.

Token reader: see "Terminal".

Turnstile: an electrically-controlled mechanical device typically enabling single-direction access from one area to another, typically enclosed area, and often enabling uncontrolled exit from such enclosed area. Typically, a control box issues a signal to the turnstile to release the gate lock, and allow a single user entrance.

Unique material: see "Smart Card" and "NMR". Several types of substances which, when electromagnetically activated, emit resonance echoes, as described in U.S. Pat. No. 5,986,550. Alternative unique materials include but are not limited to, materials and devices, which emit unique optical spectrums and images, holograms, etc.

University: a venue whose mode of access and computerized control are exemplary of educational or commercial institutions in general, granting services and product to employees and users.

User: a holder of a token, and may be referred directly or by implication as: a person, access requester; attendee, token holder, patron, spectators, viewer, subscriber, exhibitor, performer, participant, passenger, traveler, delegate, student, teacher, member, visitor, guest, player, employee, employer, manager, operator, driver, rider, or any combination thereof of members of the operator-administrated community.

Valid Time: the interval or intervals during which a granted entitlement is bona fide and acceptable, as in the Range of Times. See Range of Times.

Validation unit: an authentication unit or token terminal.

Venue: a place of interaction that benefits from access control, including, but not limited to: a stadium; a service; an arena; a theater; an amphitheater; a performance hall; a transportation terminal; a station; a convention center; a forum; a government installation; a payment scheme computer service; a chat room or Internet site; a clinic; a financial institution, a product vendor's computational site, internet, or otherwise networked group; a sports facility; a recreational complex; a country club; a night club; a private or public club; a secured computation complex; an educational institution; a membership club; a theme park; a hotel; a medical center or installation; a residential complex; a parking facility; a casino; a betting installation, a location, and computerized services thereof; a workplace; a military installation; a transport service or complex thereof. Such locations or entities are typically event-related, where computer-aided controlled access is utilized.

VIP ("Very Important Person"): an individual with preferred status in the community. In a non-limiting example, a VIP typically has reserved seating in a closed shaded box in a sports arena, with access rights to more than one restricted area in said arena; e.g., a lounge, a restaurant, etc.

Visual indicia (on posters according to embodiments of the present invention): text and/or graphics to guide a user holding a wireless handheld communicator in the processes of downloading and using applications and information as indicated on the poster. In a non-limiting example of a horse race application, visual indicia typically includes: a guide to methods for registering a bet and collecting proceeds; a guide to methods for authorizing money transfer using the user's token; and a guide to methods for accessing results of other sports events, including a summation of the user's gains and/or losses.

Therefore, according to the present invention there are provided the following:

In a venue attended by a person holding a token containing a token ID, an access control system including: (a) a token reader operative to read the token ID of the token; (b) an operator-issued authenticator communicative with the token reader, the authenticator operative to output an authorization, the authenticator containing: (i) apparatus operative to establish authenticity of the token ID; and (ii) a list of acceptable token IDs, the list having a cut-off time; and (c) a passage controller operative to allow the person holding the token access to a predetermined area of the venue upon the passage controller's receiving the authorization; wherein the authenticator outputs the authorization upon detecting the token ID in the list of acceptable token IDs.

In a venue attended by a user holding a wireless handheld communicator, a data system for communicating information and data capabilities to the person, the system including: (a) a poster having an attached wireless token operative to communicate with the wireless handheld communicator, and operative to transmit data thereto and to receive data therefrom; and (b) visual indicia printed on the poster, the visual indicia operative to guide the user to perform a procedure for establishing data transfer between the attached wireless token and the wireless handheld communicator.

In a system of tokens, wherein each token has a unique token ID and describes an attribute of a token-holder, an attribute scheme for determining whether the attribute applies to the token-holder, the attribute scheme including: (a) a list associated with the attribute, the list containing a plurality of bits, wherein each bit has a bit value and a unique address, and wherein each of the token IDs corresponds to a bit of the plurality of bits; (b) a token-reader operative to read the token ID of the selected token and operative to access the list; (c) an authenticator communicative with the token reader, the authenticator operative to: (i) determine that the attribute applies to the token-holder based on the bit value of the bit corresponding to the token ID of the selected token; and (ii) determine that the attribute does not apply to the token-holder based on the bit value of the bit corresponding to the token ID of the selected token.

In a system of tokens, wherein each token has a unique token ID and conveys a privilege to a token-holder, an entitlement scheme for determining whether the privilege is revoked for a selected token, the entitlement scheme including: (a) a list associated with the revocation of the privilege, the list containing a plurality of bits, wherein each bit has a bit value and a unique address, and wherein each of the token IDs corresponds to a bit of the plurality of bits; (b) a token-reader operative to read the token ID of the selected token and operative to access the list; (c) an authenticator communicative with the token reader, the authenticator operative to revoke the privilege to the token-holder based on the bit value of the bit corresponding to the token ID of the selected token.

In a system of tokens wherein each token has a unique token ID and wherein a presented token thereof has a presented token ID and conveys a privilege to a token-holder, a method for preventing the presented token from being used more than once to exercise the privilege, the method including: (a) providing a list containing a plurality of bits corresponding to the token IDs of the tokens, the value of an addressable bit of which indicates that the privilege is conveyed to the token-holder; (b) providing a token-reader operative to read the presented token ID of the presented token and operative to read and change the value of the addressable bit; (c) providing an authenticator communicative with the token-reader, the authenticator operative to determine if the privilege is conveyed to the token-holder, the authenticator operative to grant the privilege to the token-holder, the authenticator operative to deny the privilege to the token-holder, and the authenticator operative to rescind the privilege to the token-holder; (d) having the token-reader read the value of the addressable bit; (e) having the authenticator confirm that the privilege is conveyed to the token-holder according to the value of the addressable bit; (f) having the authenticator grand the privilege to the token-holder; and (g) having the token-reader change the value of the addressable bit.

In a system of tokens, wherein each token has a unique token ID and describes a plurality of attributes of a token-holder, an attribute scheme for determining whether a selected attribute applies to the token-holder, the attribute scheme including: (a) a list associated with the plurality of attributes, the list containing a plurality of words, wherein each word has a unique address and contains a predefined number of bits, wherein each bit has a bit value and a bit position, wherein each of the token IDs corresponds to a word of the plurality of words, and wherein the selected attribute corresponds to a bit position; (b) a token-reader operative to read the token ID of the selected token and operative to access the list; (c) an authenticator communicative with the token reader, the authenticator operative to: (i) determine that the selected attribute applies to the token-holder based on the bit value of the bit at the bit position corresponding to the selected attribute in the word corresponding to the token ID of the selected token; and (ii) determine that the selected attribute does not apply to the token-holder based on the bit value of the bit at the bit position corresponding to the selected attribute in the word corresponding to the token ID of the selected token.

BRIEF DESCRIPTION OF THE DRAWINGS

The invention is herein described, by way of example only, with reference to the accompanying drawings, wherein.

Figure 16:
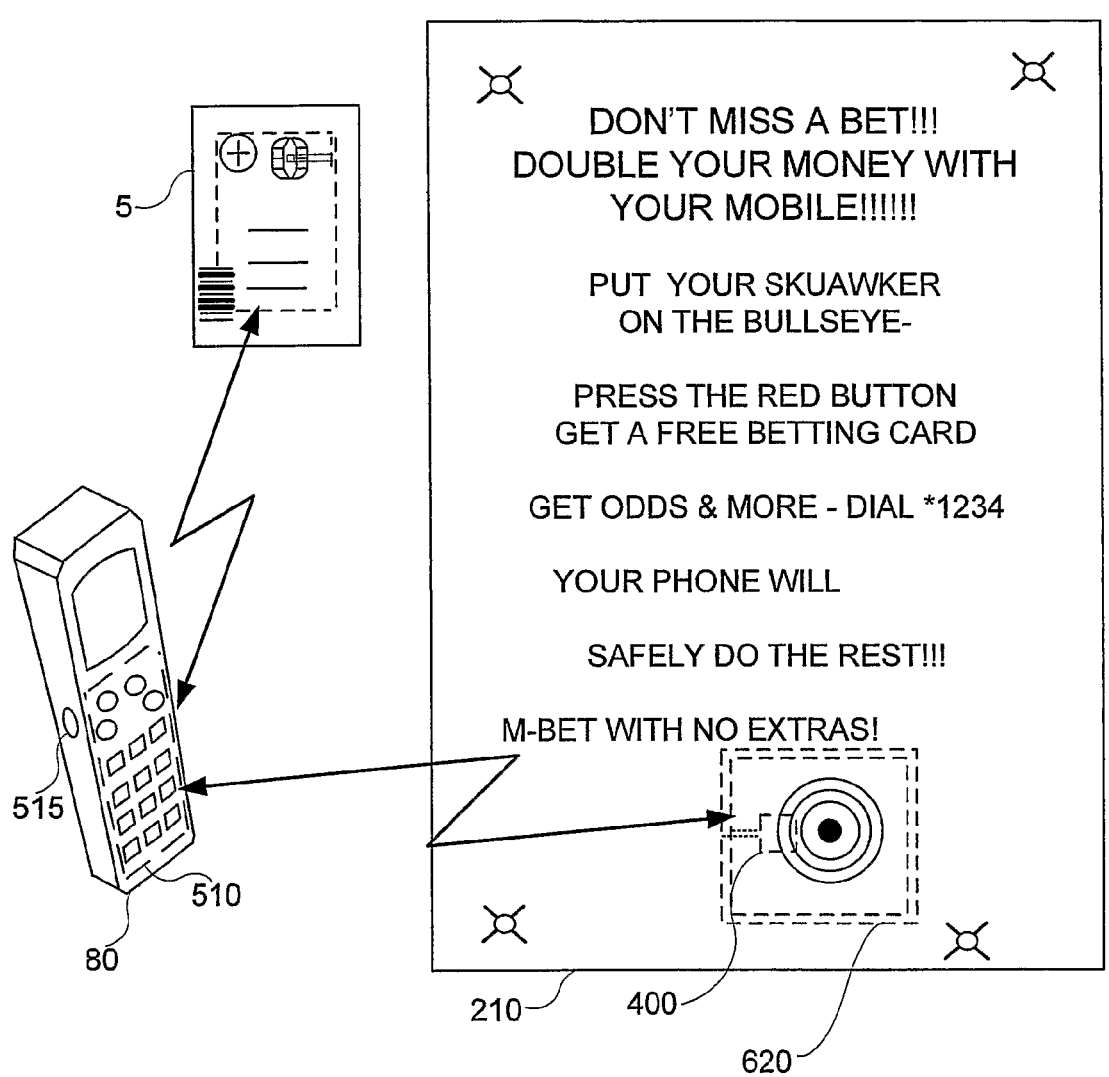
Figure 17:
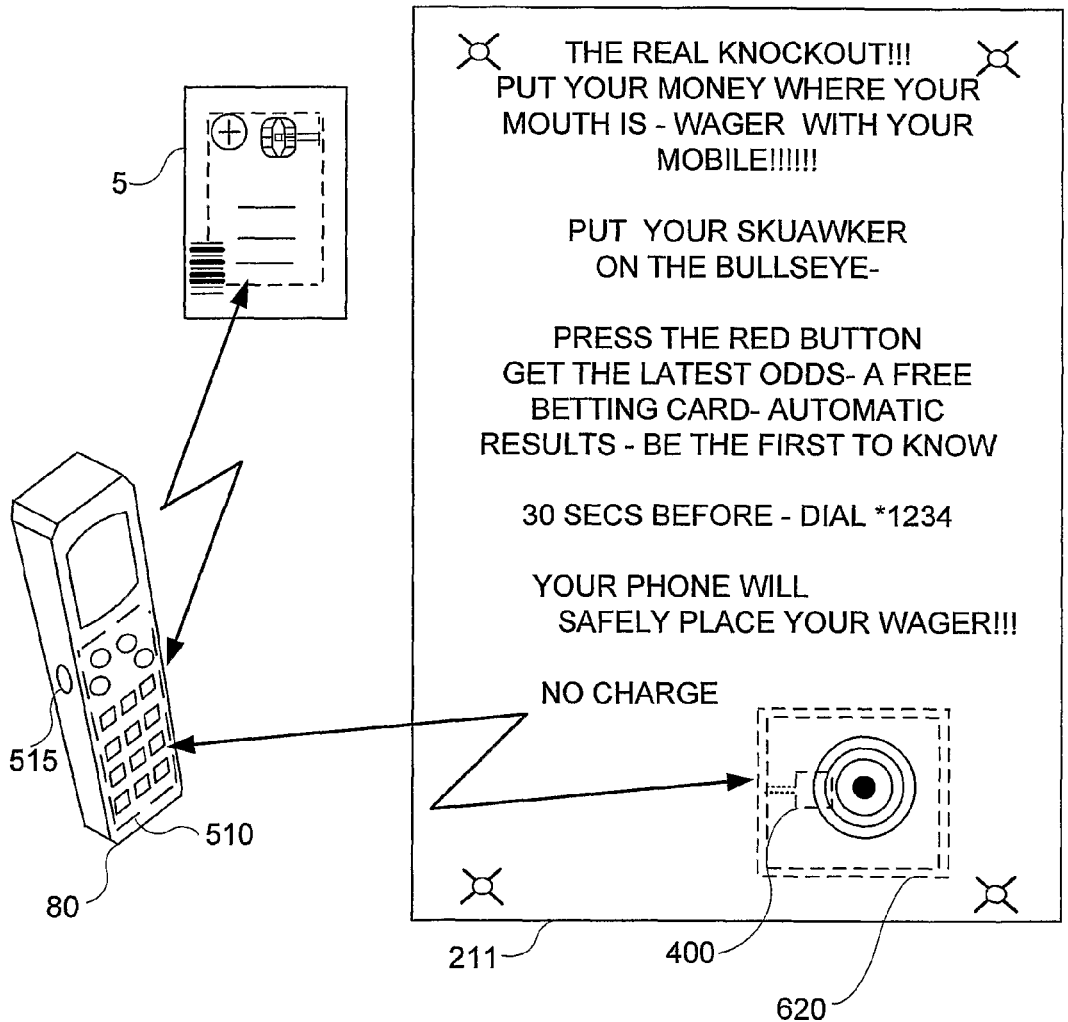
Figure 18:
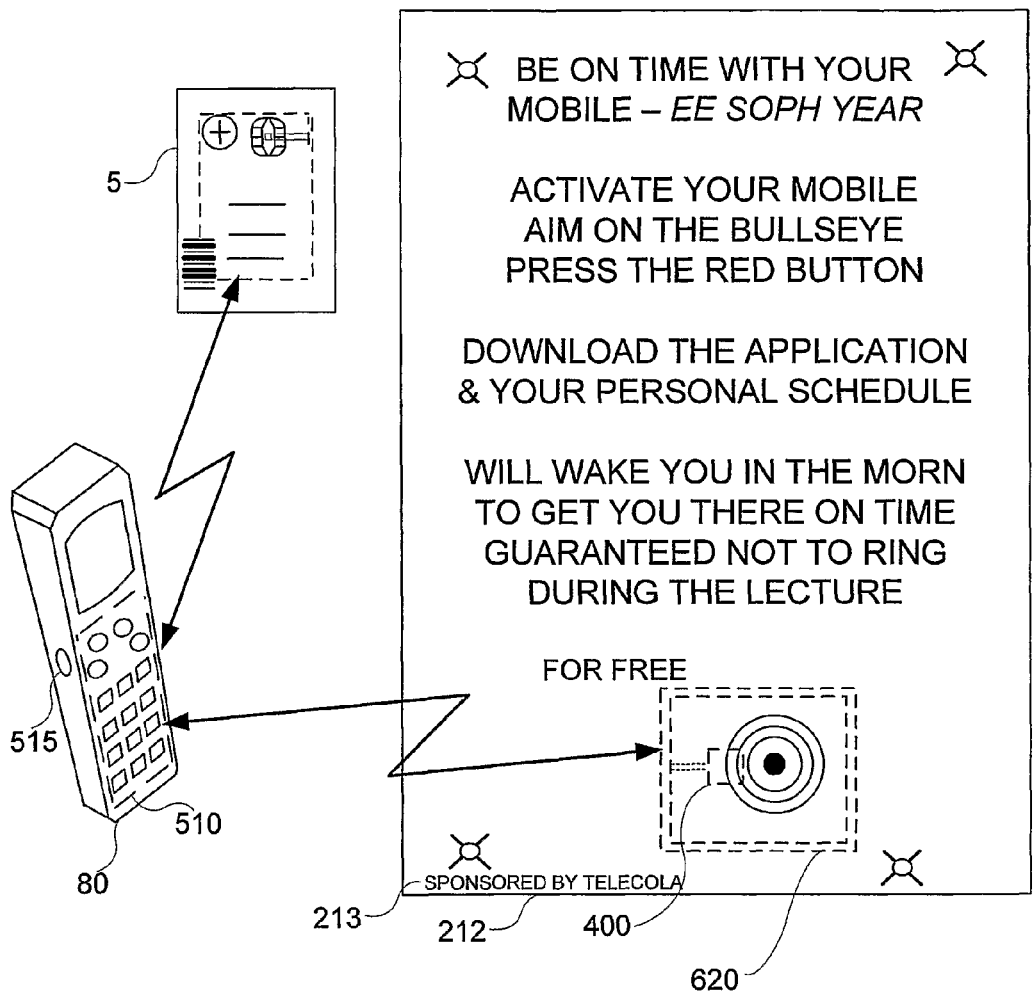

In applications in FIGS. 16, 17 and 18, in alternate preferred embodiments, the poster may guide the user with information on how to communicate and download the proposed application and information; e.g., using popular mobile phone wireless channels.

FIG. 16 is a schematic depiction of a preferred embodiment of a wireless system, operative to convey authenticated information from a poster with an attached semiconductor device and an authentication substance provably of unique origin.

FIG. 17 is a schematic depiction of a preferred embodiment of a wireless system, operative to convey authenticated information from a poster with an attached semiconductor device and an authentication substance provably of unique origin.

FIG. 18 is a schematic of a preferred embodiment of a wireless system, operative to convey authenticated information from a university poster with an attached semiconductor device which is downloaded to a mobile phone.

DETAILED DESCRIPTION OF THE PREFERRED EMBODIMENTS

Figure 1:
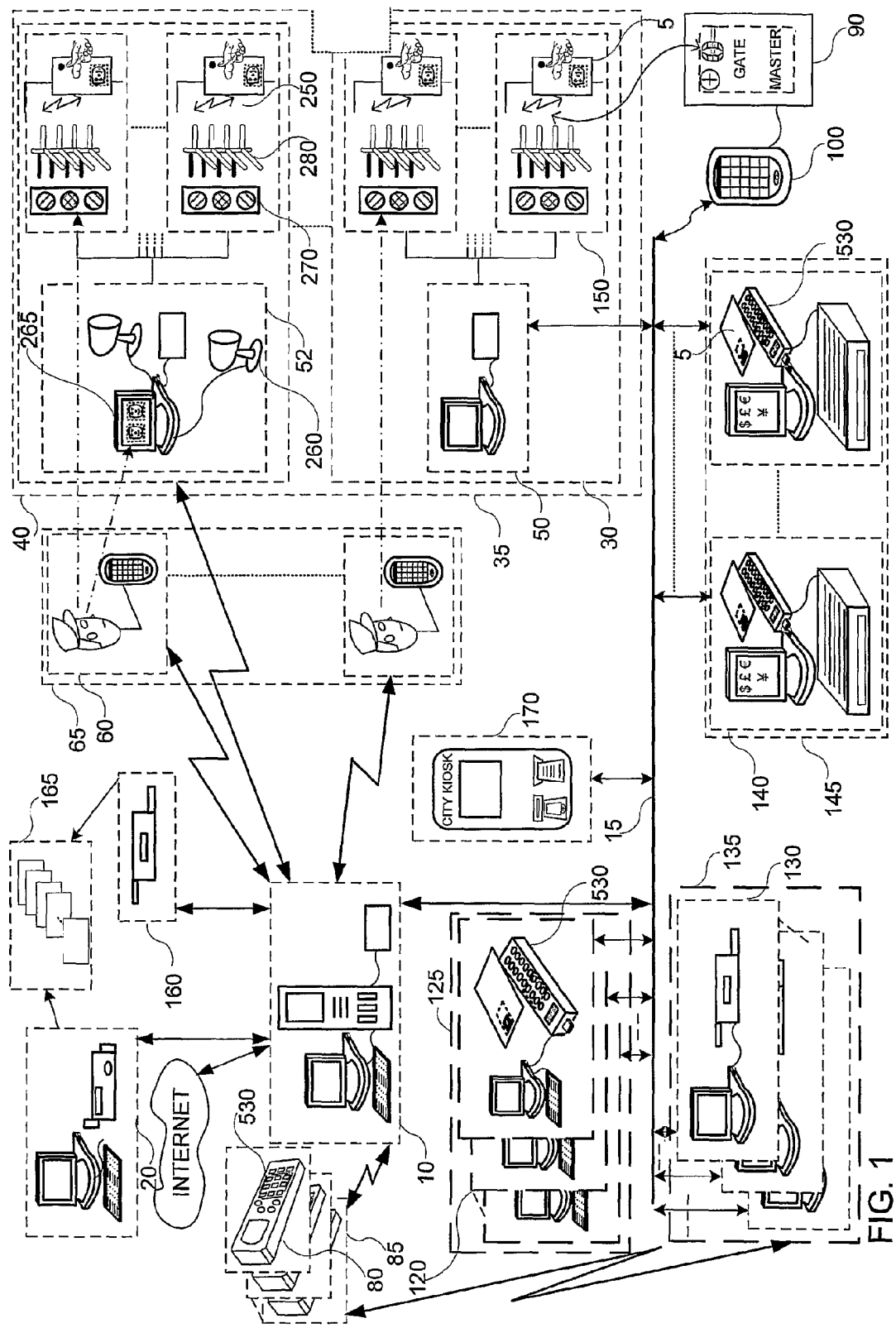
FIG. 1 is a top-level illustration of the off-line/on-line security system of a sports arena operative to use a plurality of features and functions for regulating spectator activities both inside and outside of the enclosed arena area using a multiplicity of schemes to enhance both security and required functionality.
Figure 2:
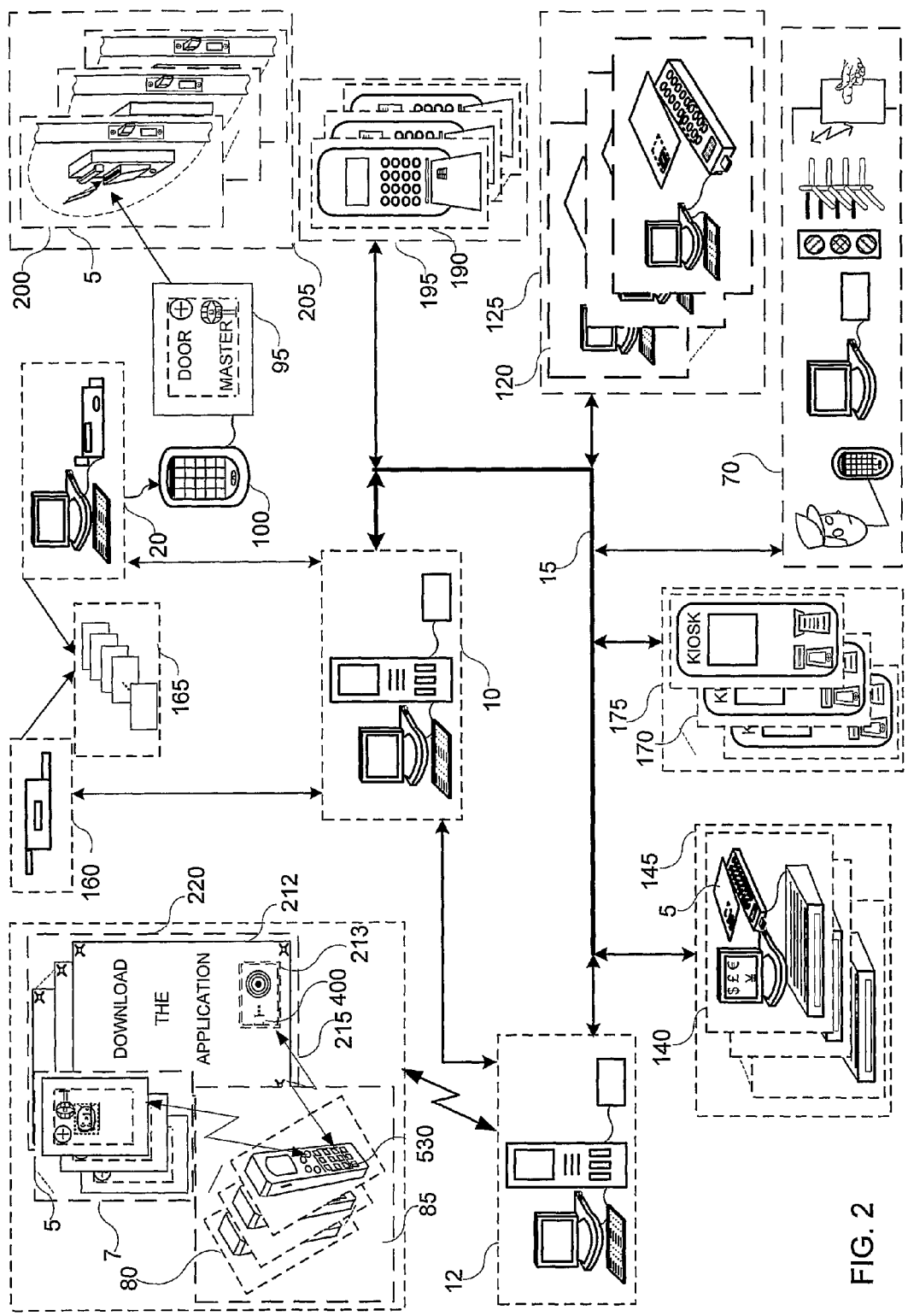
FIG. 2 is a top-level illustration of computer controlled security systems encompassing the activities of university students and employees in and around the university campus, with a multiplicity of schemes, typically relevant but not limited to: universities and colleges; convention centers; forums; recreational complexes; membership clubs; hotels; medical centers; workplaces; residential complexes; parking facilities; betting establishments; casinos; and transporters, e.g., subscribers to free transportation in a given time frame.

In FIGS. 1 and 2, two distinctly different closed group computerized systems are depicted based on similar innovative personal identification means operative to benefit system operators and users. In both systems, confidential regulation is based on personal identification tokens, 5, operable to assure a measure of security, commensurate with available resources and level of implementation; e.g., on line betting using mobile phones with Intellifiers, 530 and applications with the cluster of Posters 215 in FIG. 2, in preferred embodiments are deployed with modern security systems compliant with the Europay, MasterCard or Visa (EMV) smart card based system specifications, implemented with combinations of contact and contactless smart cards.

Figure 5:
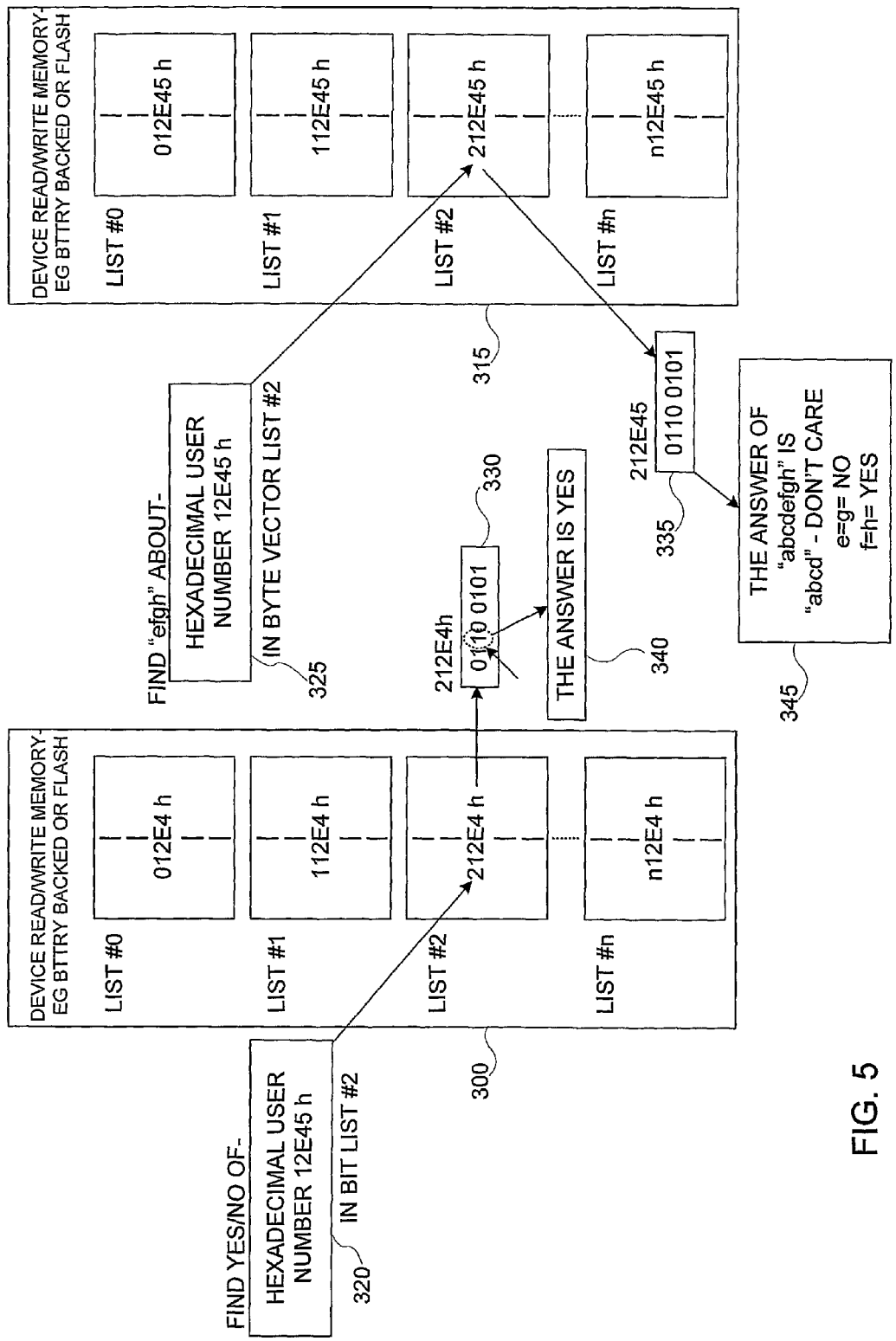
FIG. 5 is a simple depiction of the compact listings operative to enable accelerated timely authentication of status of tokens and system users, especially designed for off-line devices with limited memory capacities, e.g., hotel and dormitory door locks with small cost sensitive electronic circuitry, and for arena control boxes controlled by small microcontrollers, etc.

The Arena system of FIG. 1 is networked to a server system, 10, connected to token issuing station, 20; and to a ticket and report printer 160, operative to assemble and control a secure data base of status of users in the community, and at appropriate cut-off-times to assemble and distribute compact status lists, see FIG. 5. Server system is also operative to serve as a wireless gateway to mobile telephones, 85, and to handheld PDAs, 100, which help serve steward's, 60, control crowds, and interface elements, 90, between server, 10, in the event that network, 15, has failed, all or in part. The issuing station, typically, initializes and personalizes tokens, 5, for distribution months before the relevant sport's season. Prior to events, the issuing station, 20, prepares status listings typically for gate cluster control boxes 50 and 52; for point of sale units 140 (clustered in to subsystem, 145); for a kiosk, 170, to aid users with timely information; for betting computers, 130, clustered in subsystem 135; for stewards' PDAs, 100; for disbursed personal computers 120, with Intellifiers, 530, in subsystem 125 for use in arena ticketing offices, in corporate users offices; in operators' and agents' premises, etc.

The hardware output, 165, of the issuing station, and the report printer are typically delivered by conventional means, e.g., delivered by priority mail services and hand delivered at operator's ticket offices. Users' mobile phones, 80, with Intellifiers, 530, clustered in mobile phone networks, 85 are typically used for purchasing product, tickets, and for betting.

Typically a steward, 60, is stationed opposite clusters of controlled gates, 30 and 40, operative to monitor the in-flow of attendees, and aiding such individuals to find their way to their seats. A part of the troop of stewards with PDAs, 65, with status lists and token terminal functions is typically patrolling the stadium grounds and the incoming crowd, operative to assure family friendly movement of entitled users to their seats and to detect illicit activity. While users are entering the arena, typically, the central server, 10, polls the entrance systems, 35, via the control boxes, 50 and 52, operative to collect statistics relevant to the flow of the entering crowd, and the filling up of each section of the arena, typically complying with fire and police department rules and crowd control regulations. Typically information relevant to unruly or potentially unruly individuals will be relayed to the arena control room, not depicted. Typically, images from control box closed circuit television system, 52, of selected individuals or groups are digitally photographed with closed circuit television cameras, 260, and displayed on control box monitor 265, prior to relaying said image on fixed line network, 15, or by alternate wireless means. In high-security systems, typically suspect images are visually and digitally compared with images stored, typically, in the secured server, 10. In a preferred embodiment, when a user with a record of unruly behavior passes the turnstile, control boxes 50 and 52 are operative to signal stewards, 60, and the central control room.

Secured cluster, 30, and higher security cluster, 40, are each off-line regulated clusters of individual gates systems, 150. A gate system, 150, consists of a token terminal 250, a turnstile, 280, and a light indicator, 270. Typically the token terminal will check the relevance of the token in the system, pass the result of the relevancy check to the control box, either 50 or 52. If the result is positive, the control box typically checks if the token represents a user on the expected list. If so, and a previous token has not "proved itself" to be the "identical to" the same token, the control box typically emits a release signal to the turnstile lock, thereby allowing, typically, one person to pass the turnstile. Typically, milliseconds later, the control box causes a visual signal to appear on one of the light indicators, notifying a steward, 60, of the class of token that activated the system, to assure that an adult was not using a minor's concession token. In the event of illicit attempted entry or wrong choice of gate entry, the light indicator, 270, typically would flash red to request immediate consideration by a steward, 60.

A Gatemaster 90, is a peripheral useful to manually download relevant lists to gate control boxes, 50 and 52, to points of sale, 140, to betting terminals and to all authorized system devices. Typically, all gating systems are battery backed, and are capable of operating off-line, typically, pendant only to their having been loaded with valid operational listings. In preferred gate cluster embodiments the listing would have more than the single bit basic attribute, "expected" or "not or no longer expected"; e.g., other typical optional attributes: token owner "is" or "is not" a: VIP; the token holder "is" or "is not" a season subscriber; "is" or "is not" a minor; the token applicant "has" or "has not" a record of unruliness in the last 12 months; etc. Manual downloading of listings is relevant to points of sale, 140, to betting terminals, 130; to ticket office computers in 125; to Intellifier interfaces, 530, which are depicted on point of sale terminals, 140, on disbursed PCs, 120, and on mobile phones, 80. In preferred embodiments, stewards PDAs are operative to upload statistics from control boxes, 50 and 52, typically when said control boxes are temporarily off-line.

FIG. 1 does not depict Mobile phone arena and other remote poster driven betting applications, typically relevant to sport arenas, are depicted in FIGS. 16 and 17.

Due to the normal off-line functioning attributes of the subsystems the inflow of users is typically minimally affected when a network fails, or a single control box is inoperative.

The University token controlled system of FIG. 2 is networked to a system server, 10, and to an application gateway server, 12. The token issuing station, 20, typically, initializes and personalizes tokens, 5, typically at the outset of the school year. The token issuing station, 20, is operative to control and update a secure data base of users' status. In preferred embodiments, the ticket and report printer, 160, is typically operative to issue one-time paper ticket tokens and to issue status reports for the operator. The hardware output, 165, of the issuing station, and the report printer are typically delivered by conventional means, e.g., priority mail services and at university offices.

In preferred embodiments, prior to events, and at instants when tokens change status, e.g., students leave the university, tokens are lost, the issuing server 20 prepares status listings for the sport arena, 70; and other restricted university events; for points of sale units 140 (clustered in to subsystem, 145); for kiosks 170, for time and attendance units, 190, disbursed in the campus; for disbursed personal computers, 120, with Intellifiers, 530, in subsystem 125 for use in university administration offices, and in, university laboratories.

Dormitory (halls in the UK) doorlocks, 205, are off-line battery backed units for granting controlled, time of day and date dependent access. In preferred embodiments, typically, issuing station, 20, downloads activity lists to PDAs, operative to securely update doorlock access entitlement lists, via the Door Master, 95, interface. Issuing station, 20, programs into each entitled user's token, 5, a provable entitlement to open one or more designated door lock for suitable ranges of times. If an entitling token is lost or stolen, a university employee with a PDA and Door Master typically will have to complement only the lost token bit in the "activity list" in the specific entitled doorlock or doorlocks. Other activity lists are typically securely updated over the network, 15.

An authorized token, 5, is operative to prove access entitlement to the doorlock's internal electronic controller, which typically connects doorlock handle to the tongue of the door mechanism, operative to enable the token holder to open the designated dormitory door.

A user's mobile phone 80, typically with an Intellifiers, 530, clustered in a mobile phone network, 85, is typically used to purchase access to university events, and to download application programs, and data relevant to activities driven by posters, 220. Typically, when using a mobile phone for a poster driven purchase, the token holder will prove agreement to a financial agreement, using cryptographic attributes and means of the user's token.

The university arena subsystem, 70, typically includes the same essential elements as the arenas of FIG. 1, typically with lower levels of unruliness and less esoteric security constraints. Tokens and "expected attendee lists" serve similar functions.

The Door Master 95, is a peripheral interface useful to manually to upload stored data from system devices via a PDA, 100, e.g., which token users gained entry to a system device; to download system applications, and computer programs and to download relevant lists, see FIG. 5, to a dormitory (hall, UK) door locks, 200 in the cluster of all of the computerized door locks, 205, to a points of sale, 140 in the assembly of all of the community's points of sale, 145, via an Intellifier, 530, in any authorized device, to a poster semiconductor application device, 400, in the application poster, 213, in the subsystem of application posters, 220, to a kiosk, 170, in the subsystem of kiosks, 175, to a time and attendance device, 190 in the subsystem of time and attendance devices, 195; e.g., at entry points to the university campus, at entry points to university laboratories and lecture halls, and to other authorized system devices.

Typically, off-line devices are battery backed, typically operative for two or more years, before necessary battery replacement. On-line devices are typically battery backed with power-line battery chargers, to assure constant off-line service during power outages and brown-outs. Criterion for activity lists are obvious, including but not limited to: expected attendance, absence of delayed payments in the last 12 months, membership in good-faith of students and faculty, etc.

Application server, 12, is operative to download applications and data to poster's contactless semiconductor token, 213, and to the collection of posters, 215, and to regulate further negotiations between users' and applications typified by poster, 212 in FIGS. 2 and 18.

Figure 3:
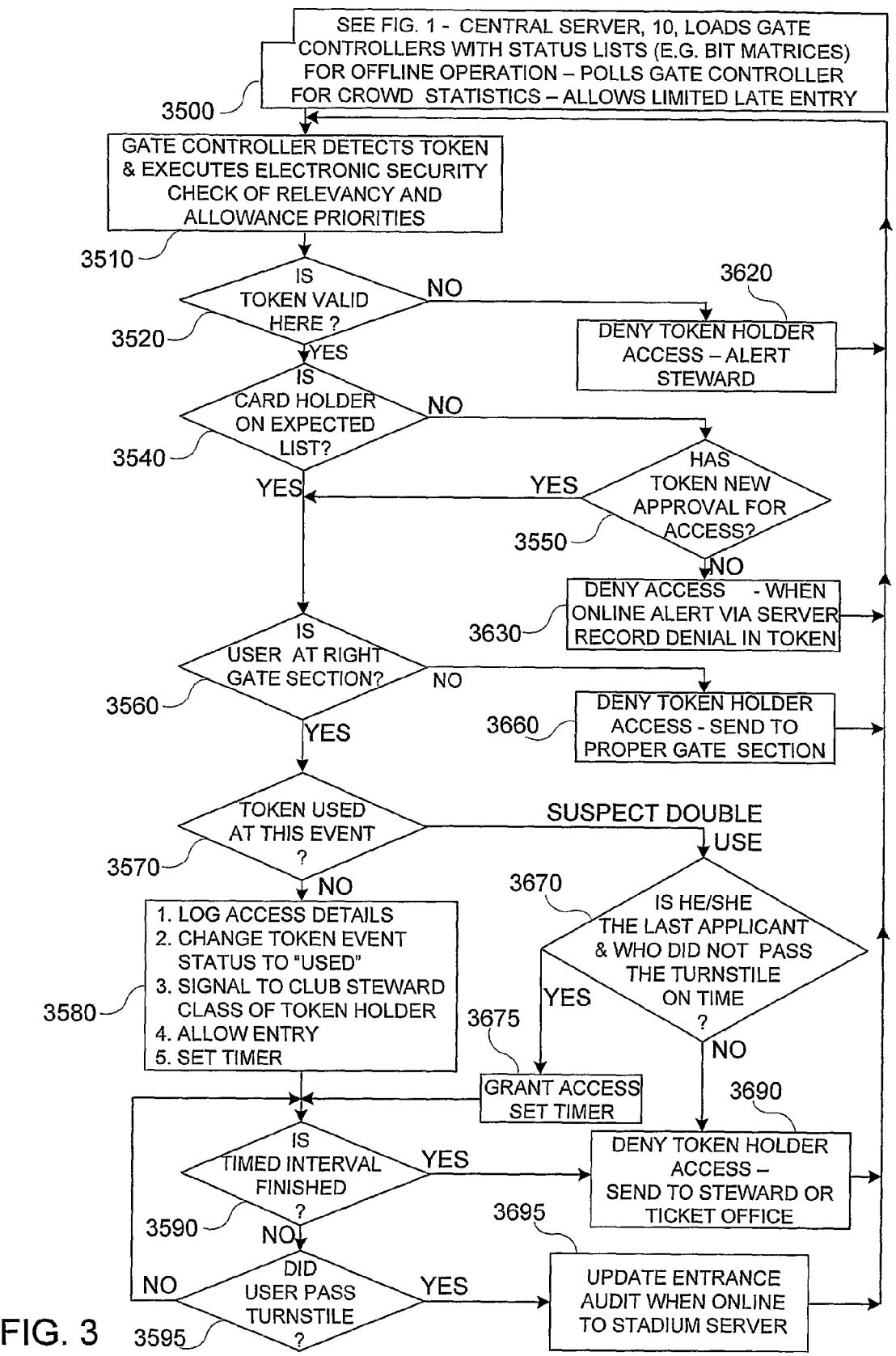
FIG. 3 is a flow chart of the central control functioning to securely provide accelerated off-line monitored entrance of crowds into an arena with the ability to provide on-line crowd statistics to assure safe punctual inauguration of a mass attended event.

FIG. 3 is a self explanatory flowchart of Fortress GB Ltd's proprietary method of accelerated managing entrance of football spectators into a sport arena. The process of allowing spectators to pass through the turnstiles is essentially an off-line procedure, capable of proceeding during intervals of unexpected power outages, and failed computer networks.

FIG. 3 is a simplified flow chart of the principal activity of crowd control in a sports arena, relevant to the cluster of entrance apparatus, 35, of FIG. 1. At introductory and background step, 3500, prior to activating apparatus, 35, activity status lists are down loaded into gate controllers (control boxes) 50 and 52; and while gates are operative to allow entry to the arena, the central server, 10, polls said gate controllers for timely statistics of flow of attendees and notification of irregular events. Steps 3620, 3630, 3660, 3690, typically result in denial of entry to unentitled token user, resulting from queries 3520, 3540, 3560, 3570, 3590 and 3595. The queries determine if the applicant token belongs to the system, if the token is on the "expected attendee list", if the entry point is compliant with the seating arrangement allotted to the applicant, and if the applicant activated the turnstile in the allotted time interval. Negative answers to such queries typically cause denial of entry.

Step 3580 describes the basic activities of the gate cluster control box, typically: to log access details, to complement the bit in the "expected attendee list"; to signal an indication to the steward, e.g., energizes a lamp in the light indicator, FIG. 1, 270; to send an auditory signal to alert a steward, (not depicted in FIG. 1); and for a short time interval to energize an unlocking device operative to allow a single authorized user to pass the turnstile.

Query 3670 typically verifies if a token represents the last applicant, and if this applicant did not succeed to activate the turnstile in the allotted interval. In such cases, step 3675 activates the turnstile unlock for the timer interval. Subsequent to the applicant's entry into the restricted area, step 3695 updates the entrance audit statistics, which are transmitted when server, 10, polls the control box.

The transmitted lists are time-stamped with date and time of last up-date, "Cut-Off Time". Typically, any "provably valid" token, which is not included in the "Active List", which has received entitlement after the "Cut-Off Time", will have provable mention of entitlement in the token memory with corresponding time of issuance of said entitlement. Typically, the token will include the specific seat in the seating entitlement.

Typically, the control "box" of a cluster of gates is operative to accept and reject users with contactless tokens. Typically, several hours prior to opening the gates to allow spectators' entrance to the stadium, the issuing station, 20, prepares "activity lists", depicted in FIG. 5, to be downloaded into control boxes, and into club stewards' PDAs. 100.

Figure 4:
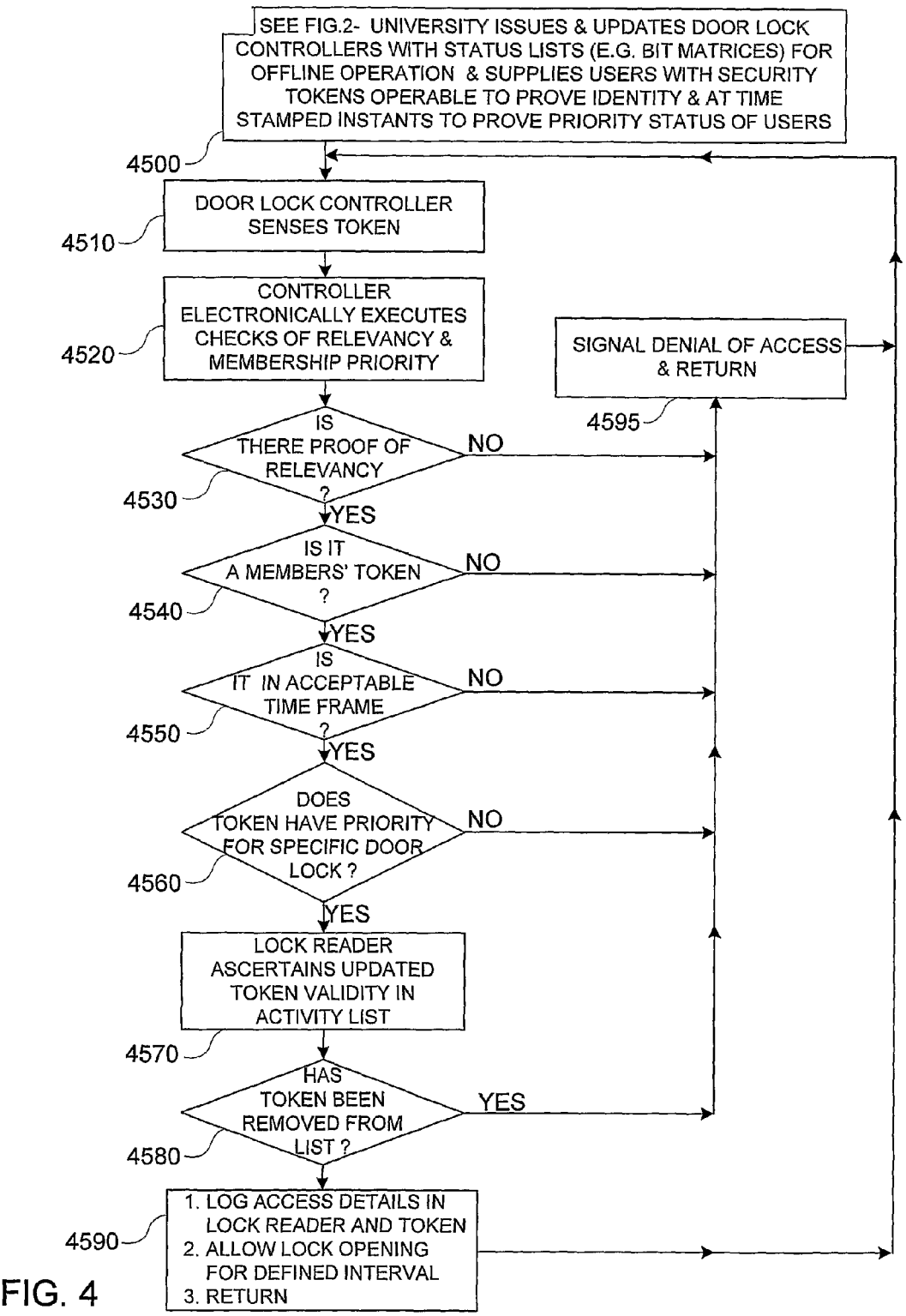
FIG. 4 is a flow chart of the control unit functioning to securely allow off-line entrance to a student dormitory for students and authorized university employees.

FIG. 4 is a flow chart of the control unit functioning to securely allow off-line entrance to a student dormitory for students and authorized university employees. The scheme, typically, has relevance for other access control embodiments described in this patent.

Introductory steps in 4500, describes system deployment of tokens and apparatus, depicted in FIG. 2. Tokens, 5, in FIG. 2, are issued to users, with authorization to enter specified rooms in defined times and dates. Doorlocks, 205 are installed, with appropriate activity lists, see FIG. 5. Such lists enable activation of unlocking device in a doorlock, 200, if token can prove authorization, and if updated activity lists in the door do not negate prior authorization.

As door locks are energized by inexpensive batteries, typically with expected life of two or more years, under normal conditions, the electronic unit is in a minimum current consumption state, "sleep mode", where typically only a real time clock will be active between token activations. At step 4510, the token is inserted into the doorlock, typically closing a switch, awakening the door lock microcontroller.

After activation of controller in Step 4520, the controller tests for proof of relevancy to the community. Typically, this process includes determining if the token is able to communicate with the doorlock controller, and prove that the token was personalized by the university.

At step 4530, the doorlock controller verifies result of step 4520, to see if the device is a device of a type issued by the university, and was personalized by the university. At step 4540, the doorlock controller verifies if the token holder is a certified member, and at 4550, if the applicant has applied for access within the priority time interval certified in the token. At step 4560, the controller checks the university's certificate to verify if the token was authorized for entrance to the specific room. If the conclusion of any of the previous queries is negative, the controller in step 4595 signals denial of access, and reverts to minimum current consumption sleep mode, wherein, typically, only the real time clock and calendar is active.

Step 4570 is necessary to ascertain if after personalization access entitlement of the token, or token holder has been revoked by the university. Such revocation is typically a result of a student's leaving the university, or that the token has been lost or stolen. If the user's bit in the activity list has been complemented, step 4580 causes denial of access. If the answer is positive, the controller, typically records access time in both the doorlock memory and in the token, and energizes the unlocking mechanism in the door for a defined, typically few second interval, allowing the token holder to enter the dormitory room.

FIG. 5 is a simple depiction of the use of compact listings operative to enable accelerated timely authentication of status of tokens and system users. Originally, this listing structure was designed for off-line and on-line devices with limited memory capacities, e.g., hotel and dormitory door locks with small cost sensitive electronic circuitry. In such instances, the answer to a query of the activity list was a simple yes or no; "is the applicant's token in the list of viable tokens?" In systems, similar to FIGS. 1 and 2, disbursed devices with larger memories execute a plurality of complex functions, which typically demand a larger variety of token holder attributes.

For limited questioning, typically, the binary file structure, 300, is sufficient. In this example, a verifying device is programmed to answer query, 320, if in list #2 user number 12e45H has a positive attribute.

Token index number 12e45 is represented in list #2, at byte address 212e4, at bit number 5. Note, the most significant hex digit of the address is the list number, and the least significant digit of the token index number, 5, is the 5th least significant bit of the byte, 330 at address 212e4H. Assuming 1 is yes, the answer to the query, 340, is yes.

In activity list structure, 315, each byte represents one token, with 8 bits representing 8 binary attributes. Query, 325, signifies a request of binary knowledge of the 4 attributes represented by the 4 least significant bits, "efgh" of user number 12e45H in List #2. Data in address 212e45H is, 01100101. In this sample, bit f=1 and bit h=1; and bits e and g are zeroes. Attributes f and h, therefore are "Yes" and attributes e and g are "No". As all consecutive index numbers of tokens in this closed system represent either a token that was issued and is presently certified, or a token that may be issued and certified for concurrent use, the memory is minimal, and the search in the listing is quickest, deterministic and immediate. User numbers can be recycled, once the certified expiration date has passed. This proprietary attribute has enabled Fortress GB Ltd. to lead the competition in the size of communities enabled in simple electronic devices with limited on board memory.

Figure 6:
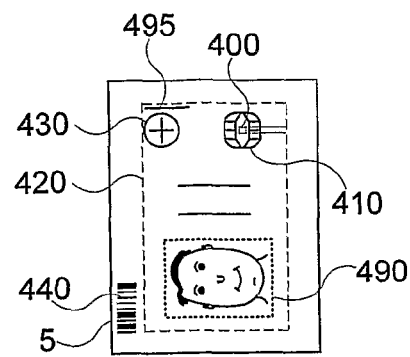
FIG. 6 is a simple depiction of a multi-system smart card styled personal identification token operative to communicate either via electronic wired connections (contact type smart card); or via radio frequency near field communication (contactless type smart card), with a an imprinted shape, a Magicon, of uniquely detectable proprietary magnetically resonant material; with a unique issue number.
Figure 7:
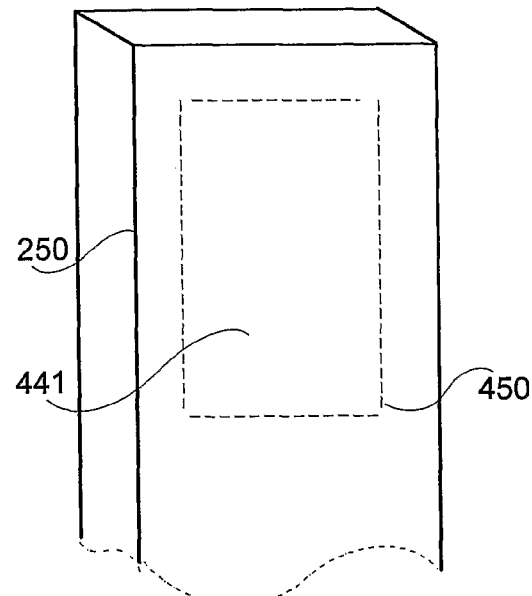
FIG. 7 is a simple depiction of a near field contactless token terminal with an internally embedded antenna operative to communicate with tokens with antennas and collaborating microchips, and also to cause unique magnetic resonance in proprietary material of FIG. 6 and with circuitry and computerized methods to detect such resonance.
Figure 8:
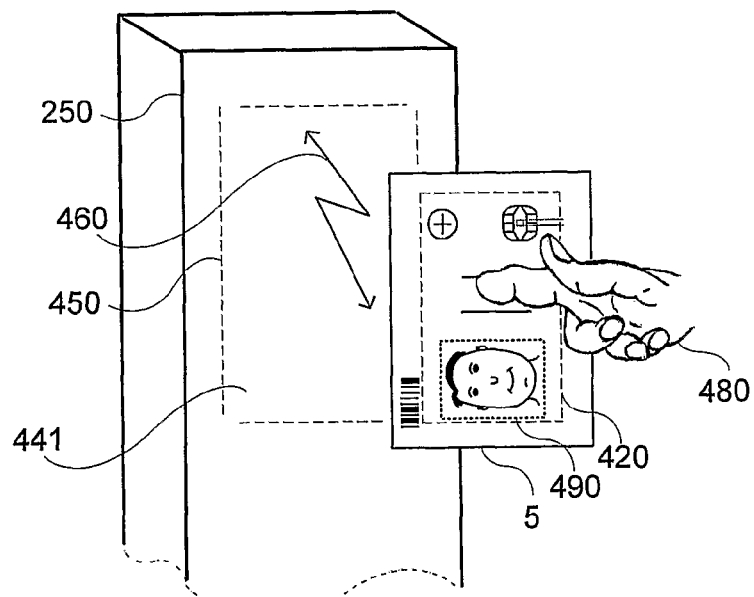
FIG. 8 is a simple depiction of a user presenting a token to a wireless token authentication terminal described in FIG. 7, wherein said token has one or more attributes pertinent to those described in FIG. 6.

FIGS. 6, 7, and 8 demonstrate several combinations of means to ensure accelerated and/or steward monitored access to closed arenas. Prior art bar-code readers and Magicon verifiers, typically hand-held, are not depicted.

FIG. 6 is a simple depiction of a multi-system smart card styled personal identification token, 5, with an embedded semiconductor integrated circuit, 400, operative to communicate either via electronic wired connections, 410, (contact type smart card); or via a radio frequency near field communication antenna, 420, (contactless type smart card), with an imprinted shape, a Magicon, 430, of uniquely detectable proprietary magnetically resonant material; an 8 digit number printed by a counter in Arial font, 6 pte size letters in dark blue with secret ink, 495; with a passport type photograph of the token holder, 490, and with a bar-code imprint, 440, operative to convey data to a bar-code reader. In preferred embodiments, said bar-coded data, 440, is imprinted with magnetic ink, typically disguised with a black non-magnetic covering imprint, typically preprinted, not depicted. Such black covering, either preprinted, or printed after unique bar-coding, does not deter a magnetic ink bar-code reader. Typically, in preferred embodiments, disguised magnetic bar-coding and or proprietary Magicon imprinting may be applied as an additional deterrent to adversaries, after original personalization of tokens; e.g., Magicons may be applied with a poor binder to an "away" ticket, at an arena, outside of entrance, when each applicant's token is verified; in preferred embodiments, a disguised bar-code or a Magicon may be applied when a subscription token is re-personalized for an additional season. The passport photo of the token owner is especially important for steward's accelerated verification of holders' of reduced price tokens; e.g., light indicators in FIG. 1 and FIG. 2 alert stewards when reduced price tokens enable token holders to enter a closed arena area.

FIG. 7 is a simple depiction of a near field contactless token terminal, 250, with an internally embedded antenna, 250, operative to communicate with tokens with antennas and collaborating microchips, and also to cause unique magnetic resonance in Magicons, 430 of FIG. 6. Not depicted is internal currently available circuitry operative to detect authentic Magicons, and currently available circuitry, 441, to read barcode, 440, typically imprinted with magnetic ink, and to communicate with tokens, via token's antenna, 420, in FIGS. 6 and 8.

FIG. 8 is a conceptual diagram, not to scale, of a token holder, 480, pressing a token, 5, into the near field, 460, to enable authentication by the token terminal, 250, operative to authenticate validity of the token, wherein said token has one or more attributes pertinent to those described in FIG. 6, wherein, at least one attribute proves relevance to the system, and at least one attribute relates to identification of the token holder.

Figure 9:
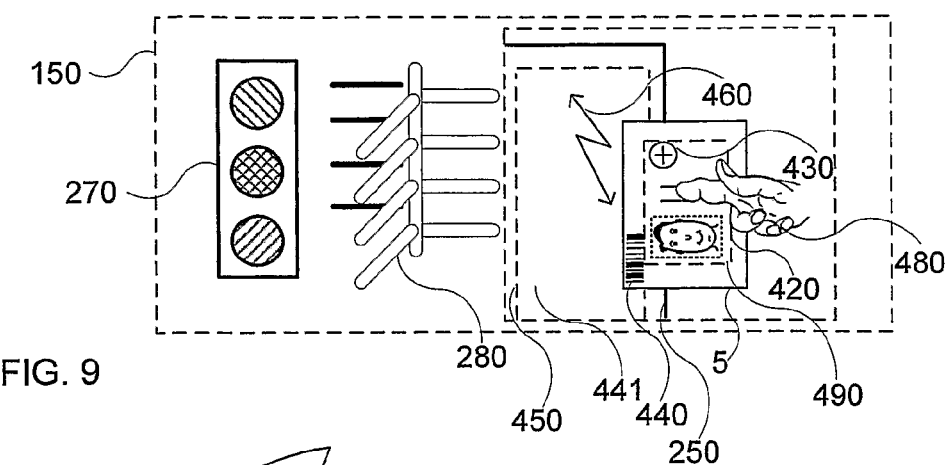
FIG. 9 is a simplified description of devices typically used at a turnstile, pertinent to allowing user passage through the turnstile barrier: a contactless token, the token authenticating terminal, the turnstile, and the status light indicator.
Figure 10:
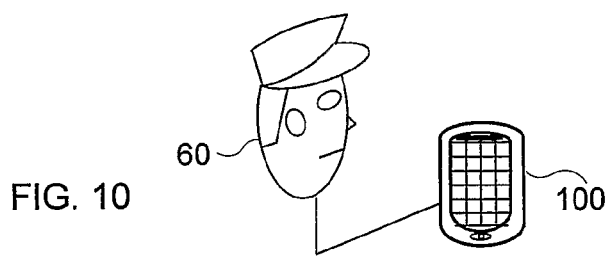
FIG. 10 is a schematic depiction of a steward with a hand held PDA type computer; typically such computerized wireless communicating devices are operative to enhance security, ensure proper use of discounted tokens and user friendly services assuring safe timely seating of crowds in the arena.

FIG. 9 is a simplified description of devices and methods in preferred embodiments, 150, useful at a turnstile, pertinent to allowing user passage through the turnstile barrier, 280. As in FIG. 8, user, 480, typically presses a token, 5, into the terminal's, 250, near field detection field, 460. In preferred embodiments terminal's antenna, 450, is operative to communicate with token's antenna, 420, and also to detect community membership, via Magicon, 430. Token's bar-code, 440, is operative to be read by bar-code reader circuitry, 441, typically enabled to read magnetic ink barcode. Turnstile, 280, is typically as schematically shown in 280, but may be any of a variety of ubiquitous electronically controlled barriers. Indicator lights, 270, are any of a combination of FIG. 1, control-box, 50, or 52, regulated indicators and devices operative to call attention to steward, 60, of FIG. 10, of exceptional or ordinary applicants. Ordinary applicants are typically token holders, who are users who have paid full price for admission to an event. Exceptional applicants may be token holders with valid tokens, e.g., users requesting entrance at the wrong section of the arena, who will typically need steward's assistance, or minors, who are typically be observed by stewards, operative to assess applicant's age and/or to compare applicant's facial features to the image, 490, on the token. Other typically exceptional applicants include token holders' with faulty or fraudulent tokens or tokens that have been previously used to gain entrance to the event, passed-back tokens, or subscription holders' tokens which have been recycled as operator's buy-backs. In preferred embodiments, Stewards' PDAs are equipped with barcode readers, NMR detectors to authenticate Magicons, and contactless smart card readers.

Figure 11A:
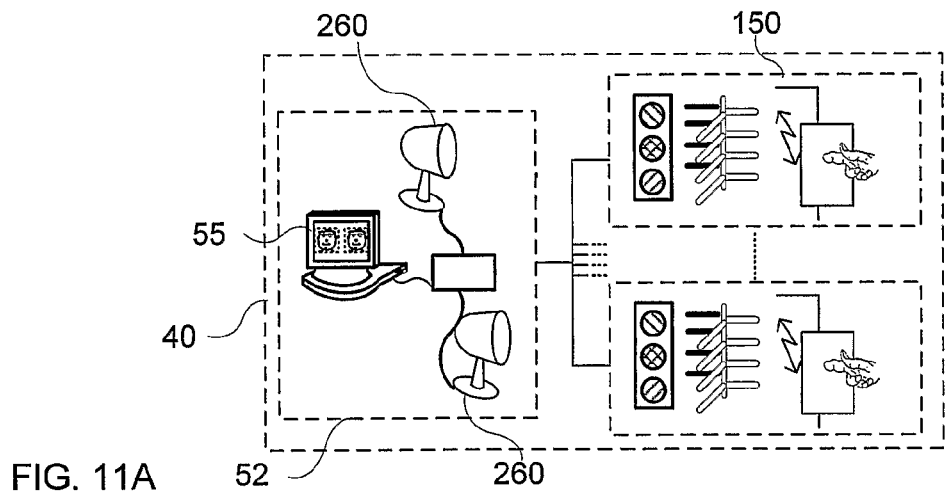
FIGS. 11A and 11B are schematic depictions of clusters of entrance turnstile gates with sub-system control boxes, in both figures, and closed circuit television for people monitoring in FIG. 11A. The sub-systems are designed for off-line crowd control with intermittent on-line auditing.
Figure 11B:
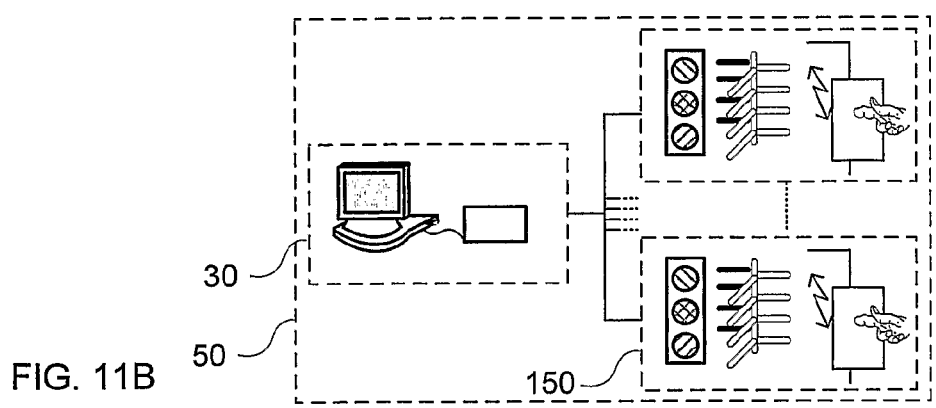

FIGS. 11A and 11B are simplified schematic depictions, 30 and 40, of clusters of entrance turnstile gates, 150, without closed circuit television monitoring in FIG. 11B, and with a sub-system control-box and CCTV imaging apparatus for people monitoring. The sub-systems are designed for off-line crowd control with intermittent on-line server 10, FIG. 1 auditing for crowd gathering statistics. Typically, central server preloads access and priority and allowance listings, described in FIG. 5, for accelerated crowd control. Control-box sub-system, 52, performs normal functions of control-box sub-system, 50, of FIG. 1, typically ascertaining, authenticating, and recording expected "non-exceptional" token holders' entrance into restricted arena area, typically on their way to be seated in the arena, while analyzing and transmitting statistics of such movements. "Exceptional" functions of control-box sub-systems, 50 and 52, typically involve alerting operator's steward's, 60, intervention to aid and direct applicants as outlined in explanation of FIG. 9. Typically, the control-box subsystems, 50 and 52, will locally record use of an authenticated token in a listing of FIG. 5, and typically are operative to locally detect attempted illicit use of a token and are operative to typically record suspect faulty or forged token usage, in proprietary listings, of FIG. 5. During the process of admitting token holders into the restricted areas, control-box subsystems are operative to function during periods of network and power outage failures, as complete off-line entities. When the arena's network, 15, is operative, central server, 10, intermittently polls control-box sub-systems, 50 and 52, to assemble estimations of percentages of attendees who are already seated. When threshold estimated percentages are reached, typically, a last call will be broadcast to lounges in the arena, requesting all attendees to proceed to their designated seats. In preferred embodiments, control-box subsystems, 50 and 52, are networked to central server's wireless gateway, typically as a fall-back to fixed-wire network, 15, (FIG. 2).

Closed circuit television cameras, 260, of control-box 52 are operative to record images of applicants entering, and or attempting to enter the restricted arena area. In preferred embodiments, such images are linked to token holder's index numbers in server's data base via listing service described in FIG. 5. Operators typically have options to record and display exceptional applicant's, including those applicants whose tokens fail to provide affirmative proof of having operator's criterion of approval to enter at a defined section of the arena.

Figure 12:
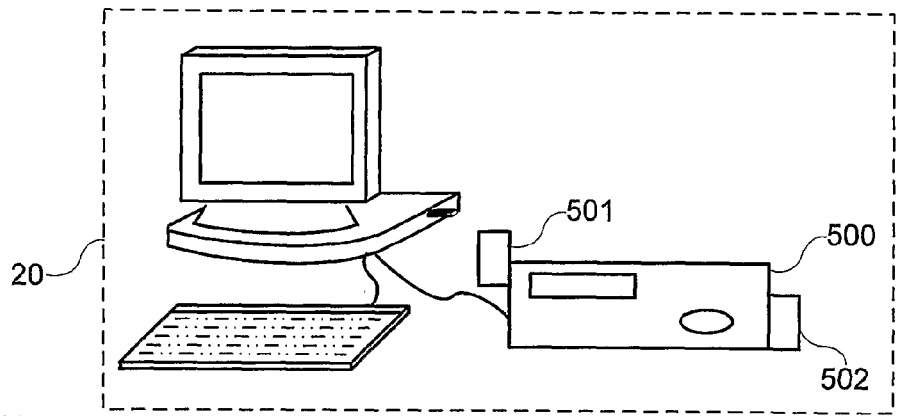
FIG. 12 is a schematic depiction of a preferred embodiment of the central secured token issuing station, typically operative to process and prepare ID tokens, typically smart cards and paper tickets, compliant with levels of security and systems administration's methods. Typically this central unit prepares listings for off-line authentication.

FIG. 12 is a schematic depiction of a preferred embodiment of the central secured token issuing station, 20, of FIG. 1, typically operative to process and prepare ID tokens, typically smart cards and paper tickets, compliant with levels of security and systems administration's methods. Typically this central unit prepares proprietary listings, as depicted in FIG. 5, for off-line authentication prior to events. Unit 500 is a schematic description of a variety of initialization and personalization devices, wherein a large number of un-personalized smart cards are introduced into automatic smart card feeder, 501. The process of initialization typically includes activating tokens to internally generate, or for issuing station to insert, secret cryptographic keys, which are operative to prove to a community terminal the validity of the token's identity and priorities. Preferred embodiments of issuing stations imprint passport type images, 490, FIG. 9, identifying information of token user, bar-code identifiers, etc. on smart card type devices. Personalized tokens are typically loaded into output magazine, 502.

Figure 13:
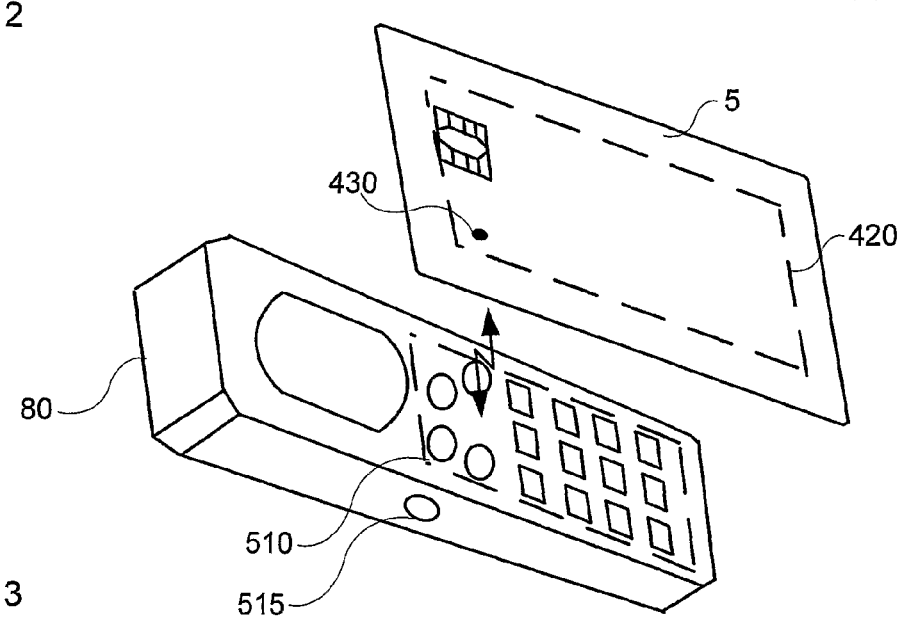
FIG. 13 is a schematic depiction of a preferred embodiment of mobile telephone system operative to communicate with a wireless token and to detect counterfeited devices in a near field. Such devices, without NMR detection attributes, are described in applicant's Provisional U.S. application No. 60/565,393.
Figure 14:
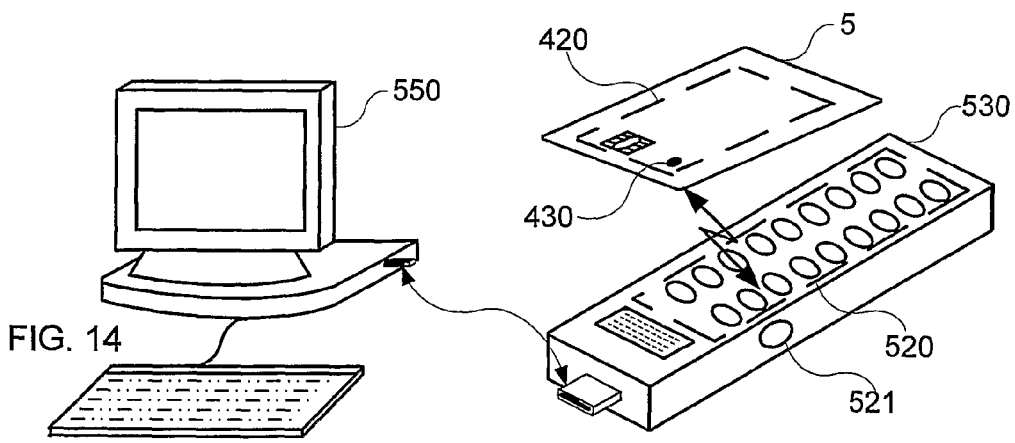
FIG. 14 is a schematic depiction of a preferred embodiment of a personal computer system, an Intellifier, operative to communicate with a wireless tokens and to detect counterfeited devices in a near field.

FIGS. 13 and 14 are schematic of the elements of interfacing a token, 5, with a mobile telephone with an Intellifier, 80, and a personal computer Intellifier, 520, both of which are described in applicant's U.S. Provisional Patent Application No. 60/565,393, operative to communicate with said token via Intellifier antenna, 510, and token antenna, 420. In preferred embodiments circuitry as sold by Micro Tag Ltd, is operative to emit electromagnetic signals via intellifier antenna, to activate and detect identifying frequencies resonated by Magicons, 430. Switch, 515, in FIG. 13, and Switch, 521, in FIG. 14, are operative to activate Intellifier circuitry by user, when placed in the close vicinity to a semiconductor module, 400, as depicted in FIGS. 13, 16, 17, and 18. Such limited interval activation is necessary to conserve battery backed energy supplies in mobile telephones and lap-top computers.

Figure 15:
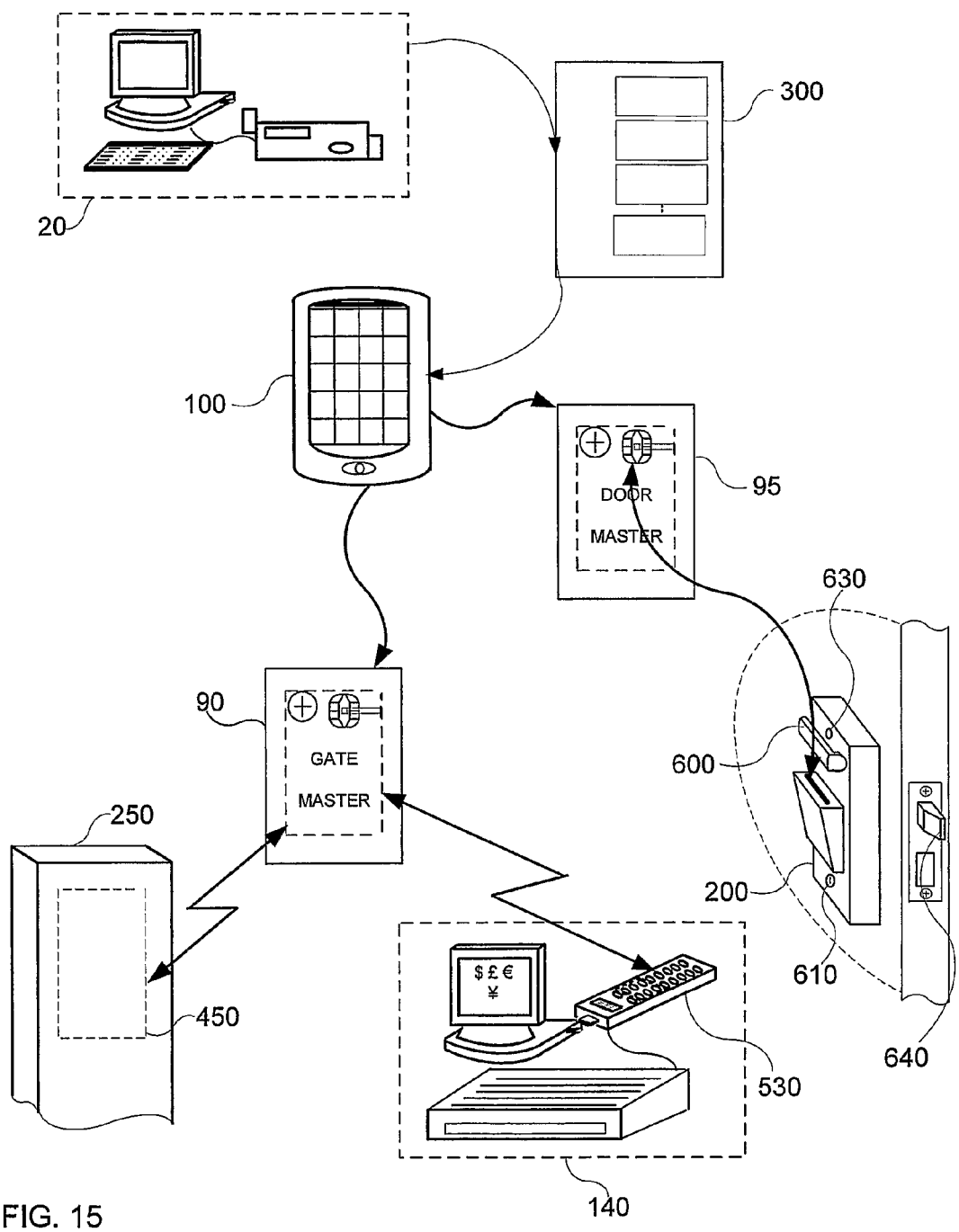
FIG. 15 is a schematic of a preferred embodiment for down-loading access and priority listings where data are downloaded into hand held computer devices with interfacing connectivity to secured door locks, points of sale, gate clusters and other terminal devices, operative to prepare said devices for future secured events and negotiations.

FIG. 15 is a schematic of preferred embodiments for downloading access and priority listings, 300, FIG. 5, from issuing station, 20, FIGS. 1, 2 and 12, typically to devices which are temporarily or permanently not networked or otherwise communicating directly with closed community devices. Issuing station converts relevant data from the confidential closed community data base into activity listings for disbursed devices. Listings, 300, in proprietary Fortress GB Ltd. activity files, are downloaded into hand held computer devices, PDAs, 100, equipped with: Door Master, 95, with interfacing connectivity to secured door locks; and/or Gate Master, 90, operative to update subsystem control-boxes, 50 and 52, and points of sale, 140, and other devices, operative to prepare said devices with necessary status of tokens for future secured events and negotiations.

Door Lock, 200, is typical of door locks outfitted with Fortress GB Ltd. proprietary door lock controllers. Initial door personalization of door lock and subsequent updating of activity listings in door lock, 200, are enacted with programs and activity lists, typically downloaded from issuing station, 20. Door lock circuitry typically consists of: a microcontroller with non-volatile memory, an external LED, 630, to signify proof of approval of token to unlock in a given time frame, time interval allowance checked against internal battery backed real-time-clock and calendar; internal battery; smart card reader terminal, operative to activate, read and verify inserted token, 5, FIG. 2; solenoid to connect door handle, 600, to door-lock tongue, 640, for a limited number of seconds, to enable authorized token holder to enter restricted access room. When personalized with a Door Master, 95, door-lock receives identity linked to room which lock protects, and an activity list to recognize all indexed tokens in the lock's community, e.g., a university or a hotel. An authorized token contains a provable certificate issued by issuing device, 20, enabling a certified token to operate door lock, 200, during the certified time frame, providing that said authorization has been invalidated.

Typically, only off-line devices, e.g., door locks and peripherals that are not connected to the community network, are updated with Door Masters, 95, and Gate Masters, 90. In the event that a token is lost, stolen, faulty or compromised, or the token holder has lost authorization, typically, the only door lock that need be updated with new activity listings, would be the specific lock to which said token holder has received authorization.

FIGS. 16, 17 and 18 demonstrate three separate proprietary poster driven schemes, from posters, 210, 211 and 212, operative to add value to operators, attendees and members of closed groups.

These schematic depictions of preferred embodiments of a wireless sub-system, operative to convey authenticated information (suggested on posters, 210, 211 and 212 in FIGS. 16, 17 and 18) from said posters, with attached semiconductor devices, 400, and an authentication substance, typically a hidden Magicon, 430, of FIG. 6, imprinted on or in said semi-conductor device are operative to enable useful applications. In a preferred embodiment, the unique authorized semiconductor device, with unique Magicon, which when authenticated by circuitry in mobile phone with Intellifier and NMR authenticator, can provably assure a downloading of virus free applications and relevant data from said posters, to a user's mobile phone.

Users read content of poster, and decide if they want to participate in the application, described on the poster. If a user chooses to participate, typically the user activates the mobile phone for the valued application by placing user's token in the near field of the mobile phone Intellifier, while energizing the intellifier by depressing switch button, 515. User downloads application, similarly, by placing mobile phone, 80, in the near field of antenna, 620, and similarly depresses switch button, 515.

Poster 210 suggests an application whereby a user engages in remote betting from his seat in the arena; learn the odds which are relevant at the time. Typically, the betting service is operative to enable the user to engage in intelligent wagers, in more than the arena.

Typically the application of poster, 210, is operative to download an event program and a gambling application to safely assure regular and last-minute betting at horse races or sports events.

FIG. 17 typifies an embodiment tailored to betting at a series of boxing matches. This application is operative to safely assure regular and last-minute betting and/or between bouts betting at boxing matches with a running account of sporting events on the mobile phone, 80.

FIG. 18 is a schematic of a preferred embodiment of a wireless system, operative to convey authenticated information from a university poster with an attached semiconductor device. In this preferred embodiment, students can easily download grades, purchase tickets to events, learn changes in classroom schedules, download classroom material, download legal music, and internet such and other data to their personal computers, and as depicted on the poster, download an application for a personal scheduling program to get a student to the right class, at the right classroom, on time, to turn off the mobile phone ringer during class time. Similar, un-depicted preferred embodiments for music concerts, wherein a program will be downloaded, and the mobile phone ringer turned off during the concert are feasible. A preferred embodiment for operatic performances typically includes the concurrent libretto in the vernacular and/or the language of the opera.

The invention claimed is:

1. An off-line/on-line access control system, with buy-back recording functionality, for controlling access to an enclosed area housing a mass attended event, the system comprising:
   a plurality of gate controllers operative to check if attendee is on a pre-downloaded expected list indicating attendees expected to participate at said mass attended event; and
   apparatus for recording that at least one attendee's privilege of access to said event has been bought back hence rescinded, by complementing a bit corresponding to the attendee in the "expected list", before a cut-off-time.

2. An off-line/on-line access control system, with buy-back recording functionality, according to claim 1 and also comprising a central controller for securely providing said gate controllers with status lists enabling said gate controllers to provide accelerated off-line monitored entrance of attendees into the enclosed area including recognizing valid attendee tokens by consulting only the status lists and without consultation via a network with a remote server; wherein said central controller stores a numerical value associated with at least one of the attendee tokens, the numerical value including at least one bit signifying that a token-holder corresponding to said at least one attendee token is an expected attendee.

3. An off-line/on-line access control system, with buy-back recording functionality, according to claim 2 wherein each token has a unique token ID.

4. An off-line/on-line access control system, with buy-back recording functionality, according to claim 2 and also comprising tokens, held by persons attending the event and each comprising a token ID, wherein each said gate controller comprises a token reader operative to read the token IDs.

5. An off-line/on-line access control system, with buy-back recording functionality, according to claim 2 wherein the numerical value also includes at least one bit signifying whether the token has or has not already been used at a particular event.

6. An off-line/on-line access control system, with buy-back recording functionality, according to claim 5 wherein said at least one bit signifying that a token-holder corresponding to said at least one attendee token is an expected attendee coincides with said at least one bit signifying whether the token has or has not already been used at a particular event because when a token-holder enters the enclosed area, a bit which indicated that a token-holder was an expected attendee at an event is complemented to indicate that currently, the token-holder is no longer considered an expected attendee at the event.

7. An off-line/on-line access control system, with buy-back recording functionality, according to claim 1 wherein said apparatus for recording includes:
   a plurality of gate controllers; and
   a central controller for securely providing said gate controllers with status lists enabling said gate controllers to provide accelerated off-line monitored entrance of attendees into the enclosed area including recognizing valid attendee tokens by consulting only the status lists and without consultation via a network with a remote server; wherein said central controller stores a numerical value associated with at least one of the attendee tokens, the numerical value including at least one bit signifying that a token-holder corresponding to said at least one attendee token is an expected attendee.

8. An off-line/on-line access control system, with buy-back recording functionality, according to claim 7 wherein said gate controller checks if attendee is on an expected list indicating attendees expected to participate at said mass attended event.

9. An off-line/on-line access control system, with buy-back recording functionality, according to claim 7 wherein, prior to opening gates to allow spectators' entrance to the enclosed area, said lists are prepared and downloaded into said gate controllers.

10. An off-line/on-line access control system, with buy-back recording functionality, according to claim 7 wherein the gate controllers provide notification of irregular events to said central controller.

11. An off-line/on-line access control system, with buy-back recording functionality, according to claim 7 and also comprising tokens, held by persons attending the event and each comprising a token ID, wherein each said gate controller comprises a token reader operative to read the token IDs.

12. An off-line/on-line access control system, with buy-back recording functionality, according to claim 11 wherein at least one token bears a time-stamp comprising a provably-authentic digital declaration of the instant that the token holder negotiated his attendance to the mass-attended event.

13. An off-line/on-line access control system, with buy-back recording functionality, according to claim 11 wherein at least one status list comprises an attribute of whether a token holder is "expected" or "not or no longer expected" to attend the mass-attended event.

14. An off-line/on-line access control system, with buy-back recording functionality, according to claim 13 and wherein said central controller comprises a buy-back functionality in which an "expected" token in the status list, the token corresponding to the attendee whose privilege has been bought back, reverts to being "not or no longer expected".

15. An off-line/on-line access control system, with buy-back recording functionality, according to claim 11 wherein each said gate controller also comprises: an operator-issued authenticator communicative with said token reader, said authenticator operative to output an authorization, said authenticator comprising: (i) apparatus operative to establish authenticity of the token ID; and (ii) a list file of acceptable token IDs, said list file having a cut-off time and comprising a stored version of said status lists; and a passage controller operative to allow the person holding the token access to a predetermined area of the enclosed area upon receipt of said authorization, wherein said authenticator outputs said authorization upon detecting entitlement of the token ID in said list of acceptable token IDs.

16. An off-line/on-line access control system, with buy-back recording functionality, according to claim 7 wherein at least one of said gate controllers comprises a cryptographically operated reader of an attendee's status.

17. An off-line/on-line access control system, with buy-back recording functionality, according to claim 7 wherein said plurality of gate controllers normally function off-line and are operative to revert to on-line mode, vis a vis said central controller, in some instances.

18. An off-line/on-line access control system, with buy-back recording functionality, according to claim 7, further comprising a steward PDA including a module to read tokens borne by attendees, operative to download at least one list from said central controller and accordingly, and to assist an attendee to find his seating arrangement.

19. An off-line/on-line access control system, with buy-back recording functionality, according to claim 7 wherein said central controller is in intermittent on-line communication with the plurality of gate controllers via a network.

20. An off-line/on-line access control system, with buy-back recording functionality, according to claim 7 Wherein entry is denied to a token holder if the entry point is not compliant with a seating arrangement allotted to the token holder.

21. An off-line/on-line access control system, with buy-back recording functionality, according to claim 7 wherein said plurality of gate controllers are disposed at entrance points to an enclosed area selected from the group consisting of: a stadium, an arena, a theater, an amphitheater, a performance hall, a financial institution, a service, a clinic, a country club, a night club, a private club, a station, a port, a convention center, a forum, a government installation, a payment scheme, a betting installation, a secured computation complex, a sports facility, a recreational complex, an educational institution, a membership club, a theme park, a hotel, a medical center, a medical installation, a residential complex, a parking facility, a casino, a workplace, and a military installation.

22. An off-line/on-line access control system, with buy-back recording functionality, according to claim 7, wherein at least one of said plurality of gate controllers has a changeable mode selected from the group consisting of: off-line and on-line; wherein said at least one gate controller is further operative to provide access control functions in said off-line mode; and wherein said at least one gate controller is further operative to download and upload data in said on-line mode.

23. An off-line/on-line access control system, with buy-back recording functionality, according to claim 7 wherein the gate controller is operative, for a given time interval, to energize an unlocking device operative to allow a single authorized user to pass a turnstile.

24. An off-line/on-line access control system, with buy-back recording functionality, according to claim 7 wherein said token comprises at least a portion of a smart card embedded in plastic.

25. An off-line/on-line access control system, with buy-back recording functionality, according to claim 7 wherein said token comprises at least a portion of a smart card embedded in paper.

26. An off-line/on-line access control system, with buy-back recording functionality, according to claim 7 wherein said token comprises a plastic semiconductor.

27. An off-line/on-line access control system, with buy-back recording functionality, according to claim 7 wherein said token comprises a circuit.

28. An off-line/on-line access control system, with buy-back recording functionality, according to claim 7 wherein said token comprises a contactless device.

29. An off-line/on-line access control system, with buy-back recording functionality, according to claim 7 wherein said token comprises a wired device.

30. An off-line/on-line access control system, with buy-back recording functionality, according to claim 7 wherein said token comprises a bar-coded device.

31. An off-line/on-line access control system, with buy-back recording functionality, according to claim 7 wherein said token comprises a device with nonvolatile memory.

32. An off-line/on-line access control system, with buy-back recording functionality, according to claim 7 wherein said token comprises a device with microprocessor control.

33. An off-line/on-line access control system, with buy-back recording functionality, according to claim 7 wherein said token comprises a device having a secret cryptographic key.

34. An off-line/on-line access control system, with buy-back recording functionality, according to claim 7 wherein said token comprises a device with symmetric cryptographic protection.

35. An off-line/on-line access control system, with buy-back recording functionality, according to claim 7 wherein said token comprises a device with asymmetric cryptographic protection.

36. An off-line/on-line access control system, with buy-back recording functionality, according to claim 7 wherein said token comprises a device containing a unique detectable material.

37. An off-line/on-line access control system, with buy-back recording functionality, according to claim 7 wherein said token comprises a hologram.

38. An off-line/on-line access control system, with buy-back recording functionality, according to claim 7 wherein said token comprises a device storing a picture of a user.

39. An off-line/on-line access control system, with buy-back recording functionality, according to claim 7 wherein said token comprises a device storing biometric information.

40. An off-line/on-line access control system, with buy-back recording functionality, according to claim 7 wherein the token is included in a smart-card derived device.

41. An off-line/on-line access control system, with buy-back recording functionality, according to claim 7 wherein the token is installed in a timepiece.

42. An off-line/on-line access control system, with buy-back recording functionality, according to claim 7 wherein the token is installed in a subcutaneous semiconductor device.

43. An off-line/on-line access control system, with buy-back recording functionality, according to claim 7 wherein the token is installed on eyeglasses.

44. An off-line/on-line access control system, with buy-back recording functionality, according to claim 1 wherein an issuing station complements the attendee's bit in the expected list, before cut-off-time, enabling a ticketing station to subsequently process a second privilege to attend the event.

45. An off-line/on-line access control system, with buy-back recording functionality, according to claim 1 which records identities of users who have reserved preferential rights to purchase privileges to attend events.

46. An off-line/on-line access control system, with buy-back recording functionality, according to claim 1 which records identity of at least one ticketing office entitled to deliver tokens issued by an issuing station and to issue tokens authorized by the issuing station, at least for one-time authorized ticket tokens.

47. An off-line/on-line access control system, with buy-back recording functionality, according to claim 7 and also comprising on-line statistics provider operative to utilize said numerical value and to provide the central controller with on-line crowd statistics including data indicating a number of attendees which have passed each gate controller, thereby to assure safe punctual inauguration of the mass attended event,
  wherein activity status lists in which each token is represented by a byte describing expectation of participation of a token holder in said event, are pre-down loaded into gate controllers.

48. An off-line/on-line access control method, with buy-back recording functionality, for controlling access to an enclosed area housing a mass attended event, the method comprising:
  providing a plurality of gate controllers operative to check if attendee is on a pre-downloaded expected list indicating attendees expected to participate at the mass attended event; and
  recording that at least one attendee's privilege of access to said event has been bought back hence rescinded, by complementing a bit corresponding to the attendee in the "expected list", before a cut-off-time,
  wherein said method includes a decision step determining whether at least one individual token detected by one of said gate controllers has been used at the mass attended event and also includes, if said individual token has been used, denying entry to at least one holder of at least one such token and, if said token has not been used, changing a token event status associated with said individual token to "used" and allowing entry of a holder of said individual token.

49. A computer program product, comprising a non-transitory computer usable medium having a computer readable program code embodied therein, said computer readable program code adapted to be executed to implement an off-line/on-line access control method, with buy-back recording functionality, for controlling access to an enclosed area housing a mass attended event, the method comprising:
  providing a plurality of gate controllers operative to check if attendee is on a pre-downloaded expected list indicating attendees expected to participate at said mass attended event; and
  recording that at least one attendee's privilege of access to said event has been bought back hence rescinded, by complementing a bit corresponding to the attendee in the "expected list", before a cut-off-time.

* * * * *